(12) United States Patent
Kang et al.

(10) Patent No.: US 12,479,898 B2
(45) Date of Patent: *Nov. 25, 2025

(54) PHARMACEUTICAL COMPOSITION COMPRISING IMMUNOGLOBULIN FC-FUSED INTERLEUKIN-7 FUSION PROTEIN FOR PREVENTING OR TREATING HUMAN PAPILLOMAVIRUS-CAUSED DISEASES

(71) Applicant: GENEXINE, INC., Seongnam-si (KR)

(72) Inventors: Moon Cheol Kang, Pohang-si (KR); Young Woo Choi, Pohang-si (KR); Donghoon Choi, Yongin-si (KR); Young Chul Sung, Seoul (KR)

(73) Assignee: GENEXINE, INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,423

(22) Filed: Jun. 1, 2023

(65) Prior Publication Data

US 2024/0018205 A1    Jan. 18, 2024

Related U.S. Application Data

(63) Continuation of application No. 15/775,182, filed as application No. PCT/KR2016/014127 on Dec. 2, 2016, now Pat. No. 11,708,399.

(60) Provisional application No. 62/361,170, filed on Jul. 12, 2016, provisional application No. 62/360,696, filed on Jul. 11, 2016, provisional application No. 62/263,262, filed on Dec. 4, 2015.

(51) Int. Cl.
| | |
|---|---|
| *C07K 14/54* | (2006.01) |
| *A61K 9/00* | (2006.01) |
| *A61K 9/08* | (2006.01) |
| *A61K 38/20* | (2006.01) |
| *A61K 47/02* | (2006.01) |
| *A61P 35/00* | (2006.01) |

(52) U.S. Cl.
CPC ........ *C07K 14/5418* (2013.01); *A61K 9/0034* (2013.01); *A61K 9/08* (2013.01); *A61K 38/2046* (2013.01); *A61K 47/02* (2013.01); *A61P 35/00* (2018.01); *C07K 2319/30* (2013.01)

(58) Field of Classification Search
CPC ............ C07K 14/5418; C07K 2319/30; A61K 38/2046
See application file for complete search history.

(56) References Cited

U.S. PATENT DOCUMENTS

| 5,093,242 A | 3/1992 | Bachmair et al. |
|---|---|---|
| 6,153,380 A | 11/2000 | Nolan et al. |
| 7,585,947 B2 | 9/2009 | Morre et al. |
| 7,589,179 B2 | 9/2009 | Gillies et al. |
| 7,867,491 B2 | 1/2011 | Yang et al. |
| 8,153,114 B2 | 4/2012 | Morre et al. |
| 8,338,575 B2 | 12/2012 | Lauder et al. |
| 10,208,099 B2 | 2/2019 | Yang et al. |
| 10,818,928 B2 | 10/2020 | Tanaka |
| 10,844,104 B2 | 11/2020 | Yang et al. |
| 2002/0127564 A1 | 9/2002 | Nolan et al. |
| 2005/0054054 A1* | 3/2005 | Foss ................... C07K 14/5418 435/325 |
| 2005/0164352 A1* | 7/2005 | Lauder ................ A61P 37/02 435/328 |
| 2005/0249701 A1 | 11/2005 | Morre et al. |
| 2006/0141581 A1* | 6/2006 | Gillies ................ A61P 35/00 435/325 |
| 2008/0206190 A1 | 8/2008 | Morre et al. |
| 2008/0300188 A1* | 12/2008 | Yang ................... A61P 7/00 435/325 |
| 2010/0196312 A1 | 8/2010 | Morre et al. |
| 2011/0243887 A1 | 10/2011 | Lauder et al. |
| 2012/0017104 A1 | 1/2012 | Morre et al. |
| 2013/0217864 A1 | 8/2013 | Cho et al. |
| 2014/0178393 A1 | 6/2014 | Andres et al. |
| 2014/0377218 A1 | 12/2014 | Morre et al. |

FOREIGN PATENT DOCUMENTS

| EP | 0314415 B1 | 8/1994 |
|---|---|---|
| EP | 0877752 B1 | 5/2003 |
| JP | H02501618 A | 6/1990 |
| JP | 2000504220 A | 4/2000 |
| JP | 2001509661 A | 7/2001 |
| JP | 2009501543 A | 1/2009 |
| JP | 2010531134 A | 9/2010 |

(Continued)

OTHER PUBLICATIONS

Bowie et al. Deciphering the Message in Protein Sequences: Tolerance to Amino Acid Substitutions. Science, 1990, 247:1306-1310 (Year: 1990).*

Burgess et al. Possible Dissociation of the Heparin-binding and Mitogenic Activities of Heparin-binding (Acidic Fibroblast) Growth Factor-1 from Its Receptor-binding Activities by Site-directed Mutagenesis of a Single Lysine Residue. J. Cell Biol. 111:2129-2138, 1990 (Year: 1990).*

Lazar et al. Transforming Growth Factoralpha: Mutation of Aspartic Acid 47 and Leucine 48 Results in Different Biological Activities. Mol. Cell. Biol., 8:1247-1252, 1988 (Year: 1988).*

(Continued)

*Primary Examiner* — Vanessa L. Ford
*Assistant Examiner* — Sandra Carter
(74) *Attorney, Agent, or Firm* — Sterne, Kessler, Goldstein & Fox P.L.L.C.

(57) ABSTRACT

The present invention relates to a pharmaceutical composition comprising an immunoglobulin Fc region and an IL-7 fusion protein. Specifically, when a fusion protein comprising the immunoglobulin Fc region and IL-7 is administered to an affected area, a strong immune response is induced in the body and thus allows human papillomavirus-caused diseases to be prevented or treated.

18 Claims, 7 Drawing Sheets

Specification includes a Sequence Listing.

(56) References Cited

FOREIGN PATENT DOCUMENTS

| JP | 2014147396 A | 8/2014 |
|---|---|---|
| JP | 201557392 A | 3/2015 |
| KR | 20060112673 A | 11/2006 |
| KR | 20090045953 A | 5/2009 |
| KR | 20120041139 A | 4/2012 |
| KR | 20140004802 A | 1/2014 |
| KR | 20170066265 A | 6/2017 |
| WO | WO-1997027213 A1 | 7/1997 |
| WO | WO-2004018681 A2 | 3/2004 |
| WO | WO-2005021592 A2 | 3/2005 |
| WO | WO-2007019232 A2 | 2/2007 |
| WO | WO-2009101737 A1 | 8/2009 |
| WO | WO-2015015516 A2 | 2/2015 |

OTHER PUBLICATIONS

Bork. Powers and Pitfalls in Sequence Analysis: The 70% Hurdle. Genome Research, 2000; 10:398-400 (Year: 2000).*
Greenspan et al. 1999. Defining epitopes: It's not as easy as it seems; Nature Biotechnology, 17:936-937 (Year: 1999).*
Seo et al. Crucial roles of IL-7 in the development of T follicular helper cells and in the induction of humoral immunity. Journal of Virology, 2014; 88(16): 8998-9009 (Year: 2014).*
Nam, H.J., et al., "Marked enhancement of antigen-specific T-cell responses by IL-7-fused nonlytic, but not lytic, Fe as a genetic adjuvant," European Journal of Immunology 40:351-358, Wiley-VCH, United States (Feb. 2010).
Seo, N., et al., "Crucial Roles of Interleukin-7 in the Development of T Follicular Helper Cells and in the Induction of Humoral Immunity," Journal of Virology, 88:8998-9009, American Society for Microbiology, United States (Aug. 2014).
International Search Report for International Application No. PCT/KR2016/014127, Korean Intellectual Property Office, Republic of Korea, mailed on Mar. 9, 2017, 8 pages.
Kroncke, R., et al., "Human follicular dendritic cells and vascular cells produce interleukin-7: a potential role for interleukin-7 in the germinal center reaction," Eur. J. Immunol 26:2541-2544, Wiley-VCH, United States (Oct. 1996).
Pellegrini, M., et al., "IL-7 Engages Multiple Mechanisms to Overcome Chronic Viral Infection and Limit Organ Pathology," Cell 144:601-613, Elsevier, Netherlands (Feb. 2011).
Miyakama, T., et al., "Molecular cloning and functional expression of a cDNA encoding glycosylation-inhibiting factor", Proc. Natl. Acad. Sci. USA, 90:10056-10060, National Academy of Sciences, United States (Nov. 1993).
Kang, M.C., et al., "Intranasal Introduction of Fe-Fused Interleukin-7 Provides Long-Lasting Prophylaxis against Lethal Influenza Virus Infection," Journal of Virology, 90(5):2273-2284, American Society for Microbiology, United States (Mar. 2016).
Muegge, K., et al., "Interleukin-7: A Cofactor for V(D)J Rearrangement of the T Cell Receptor B Gene," Science 261:93-95, American Association for the Advancement of Science, United States (Jul. 1993).
Nanjappa, S.G., et al., "Immunotherapeutic effects of IL-7 during a chronic viral infection in mice," Blood 117(19):5123-5132, American Society of Hematology, United States (May 2011).
NCBI, PDB: 4C54_A (Feb. 5, 2014), "Chain A, Crystal Structure of Recombinant Human Igg4 Fe", 2 pages.
Patel, A., et al., "Treatment of progressive multifocal leukoencephalopathy and idiopathic CD4+ lymphocytopenia," J Antimicrob Chemotherapy 65:2489-2492, Oxford University Press, United Kingdom (Dec. 2010).
Pellegrini, M., et al., "Adjuvant IL-7 antagonizes multiple cellular and molecular inhibitory networks to enhance immunotherapies," Nature Medicine 15(5):528-536, Springer, Germany (May 2009).
Rosenberg, S.A., et al., "IL-7 Administration to Humans Leads to Expansion of CDS+ and CD4+ Cells but a Relative Decrease of CD4+ T-Regulatory Cells," J Immunother 29(3):313-319, BMJ Publishing Group Ltd, United Kingdom (Jun. 2006).
Sawa, Y., et al., "Hepatic Interleukin-7 Expression Regulates T Cell Responses," Immunity 30:447-457, Cell Press, United States (Mar. 2009).
Snyder, K.M., et al., "IL-7 in allogeneic transplant: Clinical promise and potential pitfalls," Leukemia & Lymphoma, 47(7): 1222-1228, Informa, United Kingdom (Jul. 2006).
Voet, D., et al., Biochemistry, pp. 126-128 and 228-234, John Wiley & Sons Inc., United States (1990).
Watanabe, M., et al., "Interleukin 7 Is Produced by Human Intestinal Epithelial Cells and Regulates the Proliferation of Intestinal Mucosal Lymphocytes," J. Clin. Invest. 95:2945-2953, American Society for Clinical Investigation, United States (Jun. 1995).
Office Action for European Patent Application No. 16807859.0, dated May 15, 2019, European Patent Office, Munich, Germany, 15 pages.
Office Action for European Patent Application No. 16807859.0, dated Dec. 19, 2018, European Patent Office, Munich, Germany, 16 pages.
Fry, T.J., et al., "Interleukin-7: from bench to clinic," Blood 99(11):3892-3904, American Society of Hematology, United States (Jun. 2001).
Genbank, "interleukin-7 [synthetic construct]", Accession No. AAB70834.1 (Sep. 21, 1997), accessed at https://ncbi.nlm.nih.gov/protein/2425099?report=genbank& log$=protalign&blast_rank=1 &RID+IDFIPM40014, accessed on Nov. 23, 2017, 1 page.
Heufler, C., et al., "Interleukin 7 Is Produced by Murine and Human Keratinocytes," J. Exp. Med. 178:1109-1114, The Rockefeller University Press, United States (Sep. 1993).
International Preliminary Report on Patentability for International Application No. PCT/KR2016/006214, The International Bureau of WIPO, mailed on Dec. 12, 2017, 11 pages.
International Search Report for International Application No. PCT/KR2016/006214, Korean Intellectual Property Office, Republic of Korea, mailed on Aug. 24, 2016, 6 pages.
International Search Report for International Application No. PCT/KR2016/013966, Korean Intellectual Property Office, Republic of Korea, mailed on Mar. 2, 2017, 6 pages.
International Search Report for International Application No. PCT/KR2016/012495, Korean Intellectual Property Office, Republic of Korea, mailed on Jan. 13, 2017, 4 pages.
Office action for Japanese Patent Application No. 2017-564121 dated Jan. 8, 2019, 8 pages.
Bork, P., "Powers and Pitfalls in Sequence Analysis: The 70% Hurdle," Genome Research 10:398-400, Cold Spring Harbor Laboratory Press, United States (Apr. 2000).
Greenspan, N.S., et al., "Defining epitopes: It's not as easy as it seems," Nature Biotechnology, 17:936-937, Springer, Germany (1999).
Fazeli, et al., "Efficacy of HPV-16 E7 Based Vaccine in a TC-1 Tumoric Animal Model of Cervical Cancer," Cell Journal 12:483-488 (2010).
Choi, Y., et al., "Intravaginal Fc-fused IL-7 attract DNA vaccine-induced CD8 T cell in the genital tract," Cytokine 76(1):80, Elsevier, Netherlands (Sep. 2015).
Sin, J., et al., "Interleukin 7 Can Enhance Antigen-Specific Cytotoxic-T-Lymphocyte and/or Th2-Type Immune Responses In Vivo," Clinical and Diagnostic Laboratory Immunology 7(5):751-758, American Society for Microbiology, United States (Sep. 2000).
Huston, W., et al., "Vaccination to protect against infection of the female reproductive tract," Expert Rev. Clin. Immunol. 8(1):81-94, Informa, United Kingdom (Jan. 2012).
Gottlieb, S., et al., "Future prospects for new vaccines against sexually transmitted infections," Curr Opin Infect Dis. 30(1):77-86, Lippincott Williams & Wilkins, United States (Feb. 2017).
Bowie, J.U., et al., "Deciphering the Message in Protein Sequences: Tolerance to Amino Acid Substitutions," Science 247:1306-1310, American Association for the Advancement of Science, United States (Mar. 1990).
Whisstock, J.C., et al., "Prediction of protein function from protein sequence and structure," Quarterly Reviews in Biophysics. 36(3):307-340, Cambridge University Press, United Kingdom (Aug. 2003).
Burgess, W.H., et al., "Possible Dissociation of the Heparin-binding and Mitogenic Activities of Heparin-binding (Acidic Fibroblast) Growth Factor-1 from Its Receptor-binding Activities by Site-

(56) References Cited

OTHER PUBLICATIONS directed Mutagenesis of a Single Lysine Residue," J. Cell Biol. 111:2129-2138, Rockefeller University Press, United States (Nov. 1990).

Lazar, E., et al., "Transforming Growth Factor alpha: Mutation of Aspartic Acid 47 and Leucine 48 Results in Different Biological Activities," Mol. Cell. Biol. 8:1247-1252, American Society for Microbiology, United States (Mar. 1988).

Soong, R-S., et al., "Toll-like receptor agonist imiquimod facilitates antigen-specific CD8+ T-cell accumulation in the genital tract leading to tumor control through IFNγ," Clin. Cancer Res. 20:5456-67, American Association for Cancer Research, United States (Nov. 2014).

Abraham, E., et al., "Intranasal immunization with liposomes containing IL-2 enhances bacterial polysaccharide antigen-specific pulmonary secretory antibody response," J Immunol 149(11):3719-26 (Dec. 1992).

Genbank, "Interleukin-7 (precursor)", Accession No. P13232 (Jan. 1, 1990), accessed at https://www.ncbi.nim.nih.gov/protein/P13232/, accessed on Sep. 27, 2023, 5 pages.

Genbank, "Interleukin-7 (precursor)", Accession No. P56478 (Jul. 15, 1998), accessed at https://www.ncbi.nlm.nih.gov/protein/P56478/, accessed on Sep. 27, 2023, 2 pages.

Genbank, "Interleukin-7 (precursor)", Accession No. P10168 (Jul. 1, 1989), accessed at https://www.ncbi.nlm.nih.gov/protein/P10168/, accessed on Sep. 27, 2023, 2 pages.

Genbank, "interleukin-7 precursor [Chlorocebus sabaeus]", Accession No. NP 001279008 (May 21, 2014), accessed at https://www.ncbi.nlm.nih.gov/protein/NP_001279008.1/, accessed on Sep. 27, 2023, 1 page.

Genbank, "Interleukin-7 (precursor)", Accession No. P26895 (Aug. 1, 1992), accessed at https://www.ncbi.nlm.nih.gov/protein/P26895/, accessed on Sep. 27, 2023, 2 pages.

Genbank, "Interleukin-7 (precursor)", Accession No. Q28540 (Nov. 1, 1997), accessed at https://www.ncbi.nlm.nih.gov/protein/Q28540/, accessed on Sep. 27, 2023, 2 pages.

Kim, E-S., et al., "Controlled Release of Human Growth Hormone Fused With a Human Hybrid Fc Fragment through a nanoporous polymer membrane," Nanoscale 5(10):4262-4269, RSC Pub, United Kingdom (May 2013).

\* cited by examiner

1: Liver, 2: Heart, 3: Lung, 4: Spleen, 5: Kidney
6: Rectum, 7: Cervix-vagina; 8: Uterus, 9: Ovary

PHARMACEUTICAL COMPOSITION COMPRISING IMMUNOGLOBULIN FC-FUSED INTERLEUKIN-7 FUSION PROTEIN FOR PREVENTING OR TREATING HUMAN PAPILLOMAVIRUS-CAUSED DISEASES

REFERENCE TO SEQUENCE LISTING SUBMITTED ELECTRONICALLY

The content of the electronically submitted sequence listing (Name: 4241_0340006_SequenceListing_ST26.xml; Size: 69,004 bytes; and Date of Creation: Aug. 22, 2023) is incorporated herein by reference in its entirety.

TECHNICAL FIELD

The present invention relates to a composition of a fusion protein comprising interleukin-7 for preventing or treating a human papillomavirus-derived disease.

BACKGROUND ART

Interleukin-7 (hereinafter 'IL-7') is an immune-stimulating cytokine that stimulates immune responses mediated by B cell and T cell, and plays an important role in the adaptive immune system. IL-7 is mainly secreted from stromal cells of bone marrow and thymus, but also produced in keratinocytes, dendritic cells, hepatocytes, nerve cells, and epithelial cells (Haufler C et al., 1993, *J. Exp. Med.* 178 (3)): 1109-14).

Specifically, interleukin-7 activates immune function through stimulation Of the survival and differentiation of cells and B cells, the survival of lymphoid cells, and the activation of NK (natural killer) cells, and is especially important for the development of T cells and B cells. It is bound with HGF (hepatocyte growth factor) and functions as pre-pro-B cell growth-stimulating factor or a cofactor for V(D)J rearrangement of T cell receptor beta (TCRβ) (Muegge K, 1993, Science 261 (5117): 93-5). In addition, interleukin-7 regulates lymph node development through lymphoid tissue inducer (LTi) cells and promotes the expansion and survival of naive T cells or memory T cells. It is also known that IL-7 stimulates the secretion of IL-2 and interferon-gamma (interferon-γ), thereby enhancing the human immune response.

Meanwhile, papillomavirus is a DNA-based virus with a diameter of 52 to 55 nm, which infects skin and subcutaneous tissue of humans and other animals. Human papillomavirus (HPV) is usually transmitted through skin keratinocytes or mucous membranes. More than 100 human papillomaviruses (HPV) have been found so far, most of which do not show any symptoms, but in some cases they can cause papillomas in humans, Some HPVs cause the development of warts, and some cause precancerous lesions. In particular, high-risk viruses such as human papilloma virus 16 (HPV 16) and human papilloma virus 18 (HPV 18) can cause cancer such as cervical cancer and testicular cancer.

Cervical cancer is one of the most common causes of cancer-related deaths in women worldwide. Almost all of the cases are caused by infection with human papillomavirus (HPV). Among them, HPV16 and HPV18 account for about 70-75% of cervical cancer patients. Continuous proliferation of infected cells leads to a pre-malignant cervical intraepithelial neoplasia (CIN), which then gradually transform into invasive cancer.

While the prophylactic HPV vaccines can efficiently prevent HPV infection, they do not have therapeutic effects against pre-existing infection and HPV-induced lesions. The most common treatment for CIN2 and CIN3 is surgical excision, which is associated with pregnancy-related complications and a 10% recurrence rate. More seriously, the mortality rate of cervical cancer after conventional treatment is more than 50%.

Meanwhile, recently, therapies to treat HPV infection have been developed by inducing immune enhancement. It has been reported that local administration of toll-like receptor (TLR) agent 7 and 9, imiquimod and CpG after administration of vaccine including HPV16 E7 antigen induced accumulation of E7-specific CD8 T cells in the genital tract and regression of genital tumors (Soong R-S et al, 2014, *Clin. Cancer Res.* 20:5456-67). However, in humans, imiquitnod usage can induce side effects such as acute and severe local inflammation and ulceration, and administration of CpG requires repeated injections due to its short-lived efficacy. The ability of cytokines, such as IL-2 and IL-15, which function as vaccine adjuvants in animal models, were studied in order to enhance the therapeutic efficacy (Abraham E et al., 1992, *J Immunol* 149:3719-26). However, such cytokines also require repeated injections and may induce adverse effects, e.g., capillary leakage syndrome in case of IL-2.

Therefore, there still exists a need to develop effective and non-surgical therapy for the prevention and treatment of diseases caused by HPV infection.

DISCLOSURE OF INVENTION

Technical Problem

The object of the present invention is to provide a composition for preventing or treating a human papillomavirus-derived disease.

Another object of the present invention is to provide a method for preventing or treating a human papillomavirus-derived disease.

Solution to Problem

In accordance with one aspect of the present invention, there is provided a pharmaceutical composition comprising a fusion protein of immunoglobulin Fc region and IL-7. Also, there is provided a method for preventing or treating a human papillomavirus-derived disease by mucosal administration of the pharmaceutical composition comprising the fusion protein.

Advantageous Effects of Invention

In case where a fusion protein comprising immunoglobulin Fc region and IL-7 according to the present invention is administered via a mucosal route, the number of antigen-specific T cells is increased to prevent or treat a human papillomavirus-derived disease. Also, such administration is easy to conduct. Therefore, the fusion protein comprising immunoglobulin Fc region and IL-7 according to the present invention can be utilized as a new pharmaceutical composition which can replace the conventional HPV preventive vaccine.

BEST MODE FOR CARRYING OUT THE INVENTION

Figure 1:
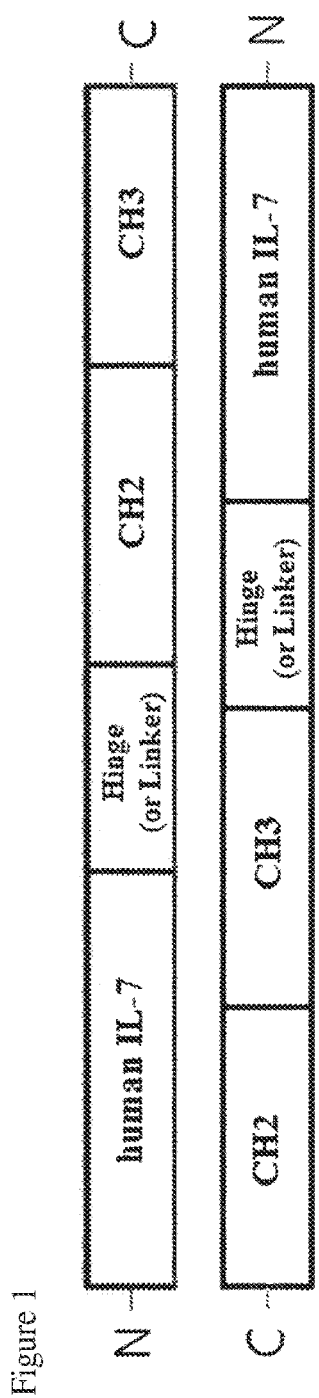
FIG. 1 is a schematic illustration of the structure of IL-7 fused with Fc.

Hereinafter, the present invention is explained in detail.

In one aspect for achieving the object, the present invention provides a pharmaceutical composition for preventing or treating a genital disease comprising an interleukin-7 (IL-7) fusion protein in which immunoglobulin Fc region is fused.

The genital disease may be a human papillomavirus-derived disease.

As used herein, the term "human papillomavirus-derived disease" or "human papillomavirus infection disease" refers to a disease caused by human papilloma virus (HPV) infection. Human papilloma virus-derived diseases can be classified into CIN1, CIN2, CIN3, LSIL (low grade squamous intraepithelial lesion), HSIL (high grade squamous intraepithelial lesion) or cancer, etc., depending on the degree of infection or status of a lesion.

As used herein, the term "interleukin-7" may be a protein having the same amino acid sequence as interleukin-7 derived from an animal or a human. Further, the term "interleukin-7" may be a polypeptide or a protein having an activity similar to the interleukin-7 derived in vivo. Specifically, the IL-7 may be a protein comprising an IL-7 protein or a fragment thereof. Also, the IL-7 may be derived from a human, a rat, a mouse, a monkey, cattle or sheep.

The IL-7 comprises a polypeptide consisting of the amino acid sequences represented by SEQ ID NO: 1 to SEQ ID NO: 6. In addition, the IL-7 may have homology of about 70%, 75%, 80%, 85%, 90%, 91%, 92%, 93%, 94%, 95%, 96%, 97%, 98%, 99% or more to the sequences of SEQ ID NO: 1 to SEQ ID NO: 6.

Specifically, human IL-7 may have an amino acid sequence represented by SEQ ID NO: 1 (Genbank Accession No. P13232); rat IL-7 may have an amino acid sequence represented by SEQ ID NO: 2 (Genbank Accession No. P56478); mouse IL-7 may have an amino acid sequence represented by SEQ ID NO: 3 (Genbank Accession No. P10168); monkey IL-7 may have an amino acid sequence represented by SEQ ID NO: 4 (Genbank Accession No. NP_001279008); bovine IL-7 may have an amino acid sequence represented by SEQ ID NO: 5 (Genbank Accession No. P26895); and sheep IL-7 may have an amino acid sequence represented by SEQ ID NO: 6 (Genbank Accession No. Q28540).

In addition, the IL-7 protein or a fragment thereof may comprise a variety of modified proteins or peptides, i.e., variants. Such modification may be carried out by substitution, deletion or addition of one or more proteins of wild-type IL-7, which does not alter the function of IL-7. These various proteins or peptides may have homology of 70%, 75%, 80%, 85%, 90%, 91%, 92%, 93%, 94%, 95%, 96%, 97%, 98%, or 99% to a wild-type protein.

In general, substitution of a wild-type amino acid residue can be accomplished by substituting alanine or a conservative amino acid that does not affect the charge, polarity, or hydrophobicity of the entire protein.

The term "IL-7 protein" as used in the specification may be used as a concept including "IL-7 protein" and a fragment thereof. The terms "protein," "polypeptide," and "peptide" may be used interchangeably, unless otherwise specified.

In addition, the IL-7 may be a modified IL-7 having the following structure:

A-IL-7, wherein said A is an oligopeptide consisting of 1 to 10 amino acid residues, and the IL-7 is an interleukin-7 or a polypeptide having the activity similar to the interleukin-7.

Herein, said A may be directly linked to the N-terminus of the IL-7 or may be linked through a linker.

Said A may increase the productivity of IL-7 and may be prepared according to the method disclosed in Korean Patent Application No. 10-2016-0072769.

As used herein, said A may be linked, to the N-terminus of IL-7. In the above formula, said A is characterized by containing 1 to 10 amino acids, which may be preferably selected from the group consisting of methionine, glycine, serine, and a combination thereof.

It is known that methionine and glycine do not induce an immune response in the human body. Although various protein therapeutic agents produced from E. coli necessarily contain methionine at the N-terminus thereof, no adverse immune effect has been reported. In the meantime, glycine is widely used in GS linker, and it is known that a commercial product such as Dulaglutide does not induce an immune response.

According to one embodiment, the IL-7 may be an oligopeptide comprising 1 to 10 amino acids selected from the group consisting of methionine (Met, M), glycine (Gly, G) and a combination thereof. Preferably, the IL-7 may be an oligopeptide consisting of 1 to 5 amino acids. For example, said A may be represented by the amino acid sequence selected from the group consisting of methionine, glycine, methionine-methionine, glycine-glycine, methionine-glycine, glycine-methionine, methionine-methionine-methionine, methionine-methionine-glycine, methionine-glycine-methionine, glycine-methionine-methionine, methionine-glycine-glycine, glycine-methionine-glycine, glycine-glycine-methionine, and glycine-glycine-glycine. Herein, the modified IL-7 may have any one of the amino acid sequences selected from SEQ ID NOS: 15 to 20.

Further, immunoglobulin Fc region may comprise an animal or human immunoglobulin Fc region, or a modified immunoglobulin Fc region thereof.

The IL-7 may be linked to the N-terminus Or the C-terminus of the Fc region. It is known that even when IL-7 is fused to the C-terminus of the Fc region, IL-7 activity is maintained (U.S. Pat. No. 8,338,575 B2). Herein, the IL-7 may be linked to Fc region through a linker.

As used herein, the term "Fc region," "Fc fragment" or "Fc" refers to a protein which comprises heavy chain constant region 2 (CH2) and heavy chain constant region 3

(CH3) of immunoglobulin but does not comprise variable regions of heavy or light chain and light chain constant region 1 (CL1). It may further comprise a hinge region of the heavy chain constant region. Hybrid Fc or a hybrid Fc fragment may herein also be referred to as "hFc" or "hyFc." Also, as used herein, the term "a modified immunoglobulin Fc region" or "Fc region variant" refers to a Fc region in which one or more amino acids in the Fc region are substituted or a Fc region which is prepared by combining different Fc regions. Preferably, it refers to a Fc region whose binding force with a Fc receptor and/or a complement has been modified so as to exhibit weakened antibody-dependent cell-mediated cytotoxicity (ADCC) or complement dependent cytotoxicity (CDC) compared to the wild-type Fc region. The modified immunoglobulin Fc region may be a combination sequence of two or more of IgG1, IgG2, IgG3, IgD, and IgG4.

In particular, the modified it immunoglobulin Fc region comprises CH2 domain and CH3 domain in the N-terminus to C-terminus direction, wherein the CH2 domain comprises a portion of an amino acid residue of CH2 domain of IgD and human IgG4, and the CH3 domain comprises a portion of an amino acid residue of human IgG4 CH3 domain.

The Fc region variant can be modified so as to prevent the cleavage at the hinge region. Specifically, the 144$^{th}$ amino acid and/or the 145$^{th}$ amino acid of SEQ ID NO: 9 can be modified. Preferably, the variant may be a mutant in which K, the 144$^{th}$ amino acid of SEQ ID NO: 9, is substituted by G or S, and E, the 145$^{th}$ amino acid, is substituted by G or S.

In particular, the Fc region of the modified immunoglobulin comprises CH2 domain and CH3 domain in the N-terminus to C-terminus direction, wherein the CH2 domain comprises a portion of an amino acid residue of CH2 domain of human IgD and human IgG4, and the CH3 domain comprises a portion of an amino acid residue of human IgG4 CH3 domain.

As used herein, the term "Fc region", "Fc fragment" or "Fc" refers to a protein which comprises heavy chain constant region 2 (CH2) and heavy chain constant region 3 (CH3) of immunoglobulin but does not comprise variable regions of heavy or light chain light chain and constant region 1 (CL1). It may further comprise a hinge region of the heavy chain constant region. Hybrid Fc Or a hybrid Fc fragment may herein also be referred to as "hFc" or "hyFc". Also, as used. herein, the term "Fc region variant" refers to a Fc, region in which one or more amino acids in the Fc region are substituted or which is produced by combining different Fc regions. The Fc region variant can be modified so as to prevent severing at the hinge region. Specifically, the 144th amino acid and/or the 145th amino acid of SEQ ID NO: 9 can be modified, Preferably, the variant may be a mutant in which K, the 144th amino acid of SEQ ID NO: 9, is substituted by C or S, and E, the 145th amino acid, is substituted by G or S.

In addition, the hFc can be represented by the following formula (I):

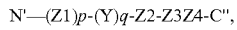  [Formula (I)]

wherein,
N' is the N-terminus of a polypeptide and C' is the C-terminus of the polypeptide,
p or q is an integer of 0 or 1,
Z1 is an amino acid sequence having 5 to 9 consecutive amino acid residues in the N-terminus direction from the 98$^{th}$ position in the amino acid residues at 90$^{th}$ to 98$^{th}$ positions of SEQ ID NO: 7, Y is an amino acid sequence having 5 to 64 consecutive amino acid residues in the N-terminus direction from the 162$^{nd}$ position in the amino acid residues at 99$^{th}$ to 162$^{nd}$ positions of SEQ ID NO: 7,
Z2 is an amino acid sequence having 4 to 37 consecutive amino acid residues in the C-terminus direction from the 163$^{rd}$ position in the amino acid residue at positions 163$^{rd}$ to 199$^{th}$ in SEQ ID NO: 7,
Z3 is an amino acid sequence having 70 to 106 consecutive amino acid residues in the N-terminus direction from the 220$^{th}$ position in the amino acid residues at 115$^{th}$ to 220$^{th}$ positions of SEQ ID NO: 8, and
Z4 is an amino acid sequence having 80 to 107 consecutive amino acid residues in the C-terminus direction from the 221$^{th}$ position in the amino acid residues at 221$^{st}$ to 327$^{th}$ positions of SEQ ID NO: 8.

In addition, the modified immunoglobulin Fc region or Fc region variant can he represented by the following formula (I):

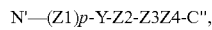  [Formula (I)]

wherein,
N' is the N-terminus of a polypeptide and C' is the C-terminus or the polypeptide,
p is an integer of 0 or 1.
Z1 is an amino acid sequence having 5 to 9 consecutive amino acid residues in the N-terminus direction from the 98$^{th}$ position in the amino acid residues at 90$^{th}$ to 98$^{th}$ positions of SEQ ID NO: 7,
Y is an amino acid sequence having 5 to 64 consecutive amino acid residues in the N-terminus direction from the 162$^{nd}$ position in the amino acid residues at 99$^{th}$ to 162$^{nd}$ positions of SEQ ID NO: 7,
Z2 is an amino acid sequence having 4 to 37 consecutive amino acid residues in the C-terminus direction from the 163$^{rd}$ position in the amino acid residue at positions 163$^{rd}$ to 199$^{th}$ in SEQ ID NO: 7,
Z3 is an amino acid sequence having 70 to 106 consecutive amino acid residues in the N-terminus direction from the 220$^{th}$ position in the amino acid residues at 115$^{th}$ to 220$^{th}$ positions of SEQ ID NO: 8, and
Z4 is an amino acid sequence having 80 to 107 consecutive amino acid residues in the C-terminus direction from the 221$^{st}$ position in the amino acid residues at 221$^{st}$ to 327$^{th}$ positions of SEQ ID NO: 8.

In addition, Fc fragment of the present invention may be a wild type sugar chain, an increased sugar chain compared with the wild type, a reduced sugar chain compared with the wild type, or a form in which the sugar chain is removed. The increase, reduction or removal of immunoglobulin Fc sugar chain can be carried out by a conventional method known in the art such as chemical method, enzymatic method and genetic engineering method using microorganisms. The removal of the sugar chain from Fc fragment rapidly reduces the binding affinity of the primary complement component C1 to C1q and results in a decrease or loss of ADCC (antibody-dependent cell-mediated cytotoxicity) or CDC (complement-dependent cytotoxicity), thereby not inducing unnecessary immune responses in vivo. In this regard, immunoglobulin Fc fragment in a deglycosylated or aglycosylated form may be more suitable for the purpose of the present invention as a carrier of a drug. As used herein, the term "deglycosylation" refers to enzymatical elimination of sugar from Fc fragment, and the term "aglycosylation" refers to the production of Fc fragment in an unglycosylated form by a prokaryote, preferably *E. coli*.

The modified immunoglobulin Fc region may comprise amino acid sequences of SEQ ID NO: 9 (hFc01), SEQ ID NO: 10 (hFc02), SEQ ID NO: 11 (hFc03), SEQ ID NO: 12 (hFc04) or SEQ ID NO: 13 (hFc05). In addition, the modified immunoglobulin Fc region may comprise the non-lytic mouse Fc of SEQ ID NO: 14.

According to the present invention, the modified immunoglobulin Fc region may be one described in U.S. Pat. No. 7,867,491, and the production of the modified immunoglobulin Fc region may be carried out with reference to the disclosure of U.S. Pat. No. 7,867,491.

In addition, the interleukin-7 fusion protein in which immunoglobulin Fc region is fused may have the amino acid sequence of any one of SEQ ID NOS: 21 to 27.

Meanwhile, the interleukin-7 fusion protein in which immunoglobulin Fc region is fused according to the present invention may further comprise a pharmaceutically acceptable carrier. The pharmaceutically acceptable carrier may be any carrier that is suitable for being delivered to a patient and is non-toxic to the patient. Distilled water, alcohol, fats, waxes and inert solids may be included as carriers. Pharmacologically acceptable adjuvant (a buffer or a dispersant) may also be included in the pharmacological composition.

In another aspect of the present invention, there is provided a method for preventing or treating a genital disease comprising administering to an individual an interleukin-7 (IL-7) fusion protein in which immunoglobulin Fc region is fused and a pharmaceutically acceptable carrier.

The genital disease may be a human papillomavirus-derived disease, for example, cervical cancer.

Herein, the method of administration to an individual may be a local administration, preferably mucosal administration. In case of that the composition of the present invention is provided topically, such as intravaginal or aerosol administration, the composition preferably comprises a portion of an aqueous or physiologically compatible body fluid suspension or solution. Accordingly, the carrier or vehicle may be physiologically acceptable, and thus it can be added to the composition and delivered to the patient, which does not adversely affect the electrolyte and/or volume balance of the patient. Thus, a carrier fix a formulation may generally include physiologic saline. Also, it may include a portion of viscous suspension or solution depending on the lesion or physiological condition.

The method for preventing or treating a disease using a fusion protein of the present invention or a composition comprising the same may comprise administering another drug or physiologically active substance having the effect of preventing or treating a disease in combination with the protein or the composition of the present invention, while the route, timing, and dosage of the administration may he determined depending on the type of a disease, the disease condition of a patient, the purpose of treatment or prevention, and other drugs or physiologically active substances co-administered.

The isolated nucleic acid molecule encoding the modified interleukin-7 or a fusion protein comprising the same may encode a polypeptide having an amino acid sequence selected from the group consisting of SEQ ID NOS: 15 to 25. The nucleic acid molecule may comprise a polynucleotide sequence selected from the group consisting of SEQ ID NOS: 29 to 39. The nucleic acid molecule may further comprise a signal sequence or a leader sequence.

Mode for the Invention

Hereinafter, the present invention is explained in detail. The following Examples are intended to further illustrate the present invention without limiting its scope.

Preparation Example 1: Preparation of Experimental Animals

Female C57BL/6 mice, 8-10 weeks of age used in the following examples were purchased from The Jackson Laboratory (Bar Harbor, USA). All animals were raised under specific pathogen-free conditions in the animal care facility in POSTECH. The procedures of animal experiments were performed in accordance with the National institutes of Health (NIH) guidelines for mouse experiments. The protocol was approved by the Institutional Animal Care and Use Committee (IACUC). Also, female Sprague-Dawley rats at 11 weeks of age were purchased from the Charles River Laboratories (Raleigh, USA). All animals were raised under specific pathogen-free conditions in the animal care facility of MPI research. The procedures of animal experiments were performed in accordance with the regulations outlined in the United States Department of Agriculture (USDA) animal welfare act (9 CFR, parts 1-3).

Preparation Example 2: Preparation and Treatment of Fusion Protein of Fc and IL-7

The codon-optimized human IL-7 and granulocyte colony-stimulating factor (G-CSF) genes were individually fused with a hybrid Fc-fragment. The schematic structure of Fc-fused. IL-7 is shown in FIG. 1. Chinese hamster ovary (CHO) cells were stably transfected with a plasmid encoding IL-7-Fc and G-CSF-Fc And then, IL-7-Fc and G-CSF-Fc were obtained from the cells. Purified recombinant human IL-7 (rIL-7), for a control group, was purchased from Biolegend (San Diego, USA).

3 mg of medroxyprogesterone acetate (Depo-Provera, Pfizer) was subcutaneously injected to mice in a diestrus state 4 days before treatment. The mice were anesthetized by intraperitoneal injection with 100 mg/kg ketamine (Yuhan) and 10 mg/kg xylazine hydrochloride (Bayer) in PBS. Then, 10 μg of rIL-7, IL-7-Fc or G-CSF-Fc were mixed with PBS and applied (administered) on the vaginal mucosal tissues using a micropipette.

Preparation Example 3: Identification of Fluorescence-Conjugated IL-7-Fc in the Genital Tract IL-7-Fc was coupled with Cy-5.5 mono-reactive NHS ester, Eluted proteins were desalted and concentrated by using centrifugal filter devices (Merck Millipore) and protein concentration of the dye-labeled IL-7-Fc was measured using an anti-human IL-7 ELISA set (Southern Biotech), Cy-5.5-conjugated IL-7-Fc (1 mg/kg) and Cy-5.5 in PBS were intravaginally administered to anesthetized mice with equivalent signal intensity. At days 1 and 7 after administration, mice were euthanized and their vaginas were washed, and each of the organs was obtained. The fluorescence signal intensity was then quantified using an IVIS spectral machine (Caliper Life Science). Signal intensity was measured quantitatively in the organ by measuring photons per second per centimeter squared per steradian (p/s/cm$^2$/sr).

Preparation Example 4: Quantification of Serum IL-7

Blood samples were collected before administration and up to 7 days after administration of IL-7-Fc, and serum IL-7 concentration was measured using a human IL-7 ELISA set (Southern biotech).

Preparation Example 5: Toxicity Studies Depending on Repeated Administration After topical administration of IL-7-Fc, for histopathological analysis using a microscope, 0.8, 3 and 8 mg/kg/dose of IL-7-Fc were intravaginally administered to rats once a week for 4 weeks (total dose of 5). The uterine cervix/vaginal tissues were excised and fixed with neutralizing formalin. The fixed tissues were placed in paraffin, cut with a thickness of 4-6 μm and stained with hematoxylin and eosin (H&E, Sigma-Aldrich). To determine the dose-dependence of vaginal inflammation, rats were observed individually at 4 hours and 24 hours after each dose administration and weekly. The following scoring scale was used: 0=no erythema, 1=very slight erythema (barely perceptible), 2=well-defined erythema, 3=moderate erythema, 4=severe erythema (redness) to eschar formation.

Preparation Example 6: Splenocytes and Cervix/Vagina (CV) Cell Isolation

Spleen and CV tissues were surgically excised using sterile technique. The splenocytes were obtained by mechanically disrupting the tissues. For the preparation of CV cells, CV tissues were minced and treated with 1 mg/ml collagenase D (Roche) and 0.5 mg/ml DNase (Sigma-Aldrich). The cells were passed through a 40 μm strainer (BD), washed, and re-suspended with RPMI-1640 containing 10%, FBS and antibiotics.

Preparation Example 7: Flow Cytometry

To prevent non-specific binding of immunoglobulins to Fc receptor, the cells used in the following Examples were treated with CD16/32 (2.4G2) and stained with the following monoclonal antibodies: CD4 (RM4-5), CD8 (53-6.7), CD44 (IM7), CD62L (MEL-14), CD11b (M1/70), CD11c (N418), and MHCII (M5/114.15.2), from eBioscience; CD3e (145-2C1), and TCRγδ (GL3), from BD; CXCR3 (CXCR3-173), from Biolegend; and Live/Dead (Life technologies). All samples were analyzed using an LSR Fortessa (BD) and FlowJo software (Tree Star).

Preparation Example 8: Statistical Analysis

A two-tailed paired Student's t-test was used to evaluate the statistical difference between the two experimental groups. For in vivo tumor experiments, differences in survival rates between the groups were determined by a tog-rank test using the Prism 5.0 software (GraphPad).

Example 1: Assessment of Administration Method of IL-7-Fc Fusion Protein

Figure 2A:
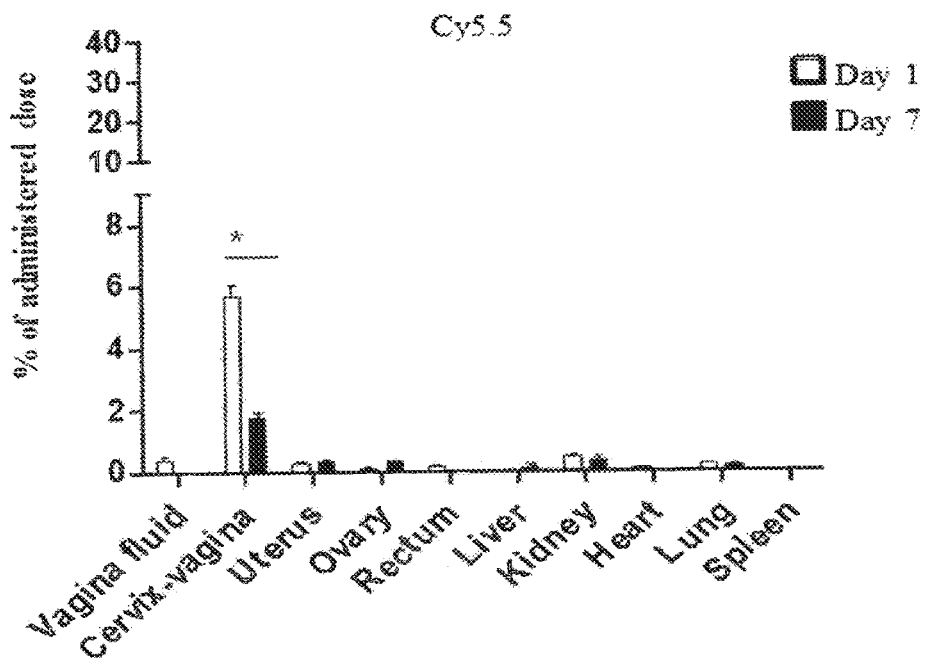
FIGS. 2a and 2b are bar graphs and fluorescence images, respectively, which show fluorescence intensities in various organs on days 1 and 7 after administration of Cy5.5 and IL-7-Fc-Cy5.5 to the mucous membrane, respectively (*, p<0.05).
Figure 2A:
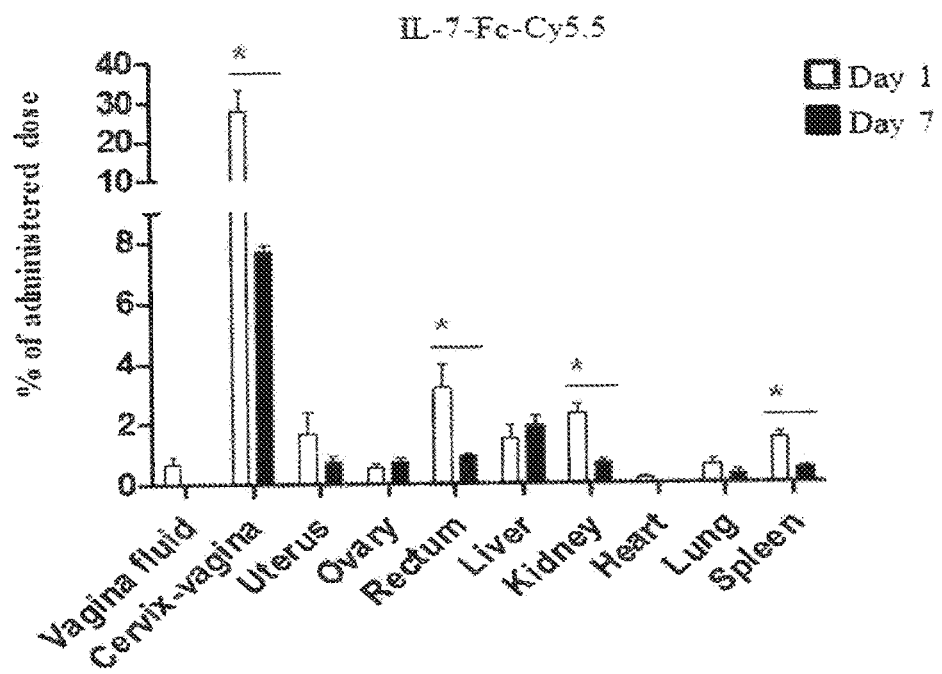
Figure 2B:
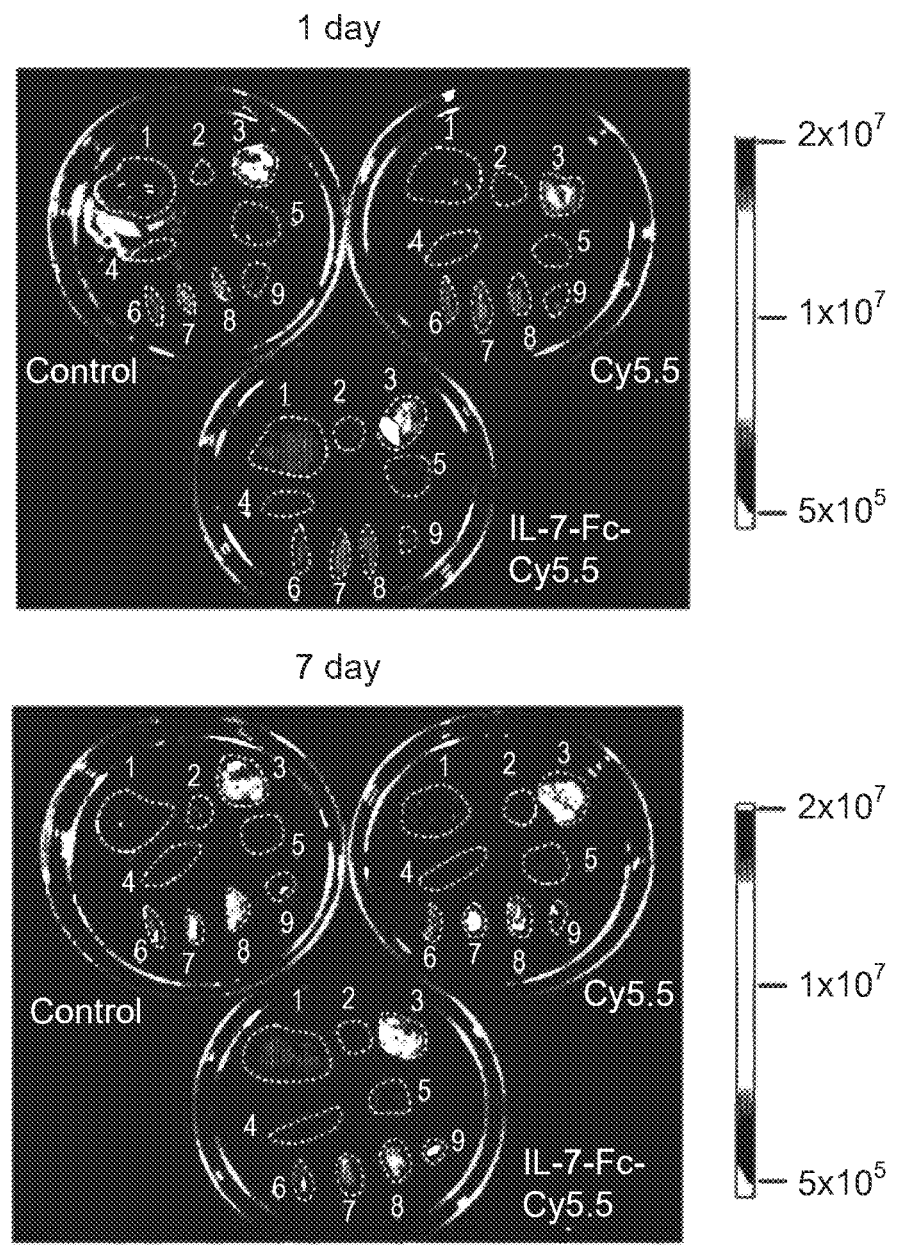

Cy-5.5 (Cy-5.5) and Cy-5.5-conjugated IL-7-Fc (Cy5.5-IL-7-Fc) were intravaginally administered to C57BL/6 wild-type mice (n=3/group), The results are shown in FIGS. 2a and 2b.

As shown in FIGS. 2a and 2b, the intensity of Cy-5.5-IL-7-Fc in the cervix/vagina (CV) tissues increased significantly at 1 day post-administration and observed for 7 days. In particular, signal intensities in CV tissues of Cy5.5-IL-7-Fc-treated mice were 6 and 4.5 times higher than the control (Cy5.5 treated mice) at days 1 and 7 after administration, respectively. Fluorescence signals were also detected at high intensities in various cervix/vagina adjacent tissues (cervix-vagina, uterus, ovary, and rectum) of Cy5.5-IL-7-Fc-treated mice. In particular, mice treated with Cy5.5-IL-7-Fc maintained high levels of fluorescence not only in the genital tract tissues but also in the liver, kidney and spleen even at day 7.

Figure 3:
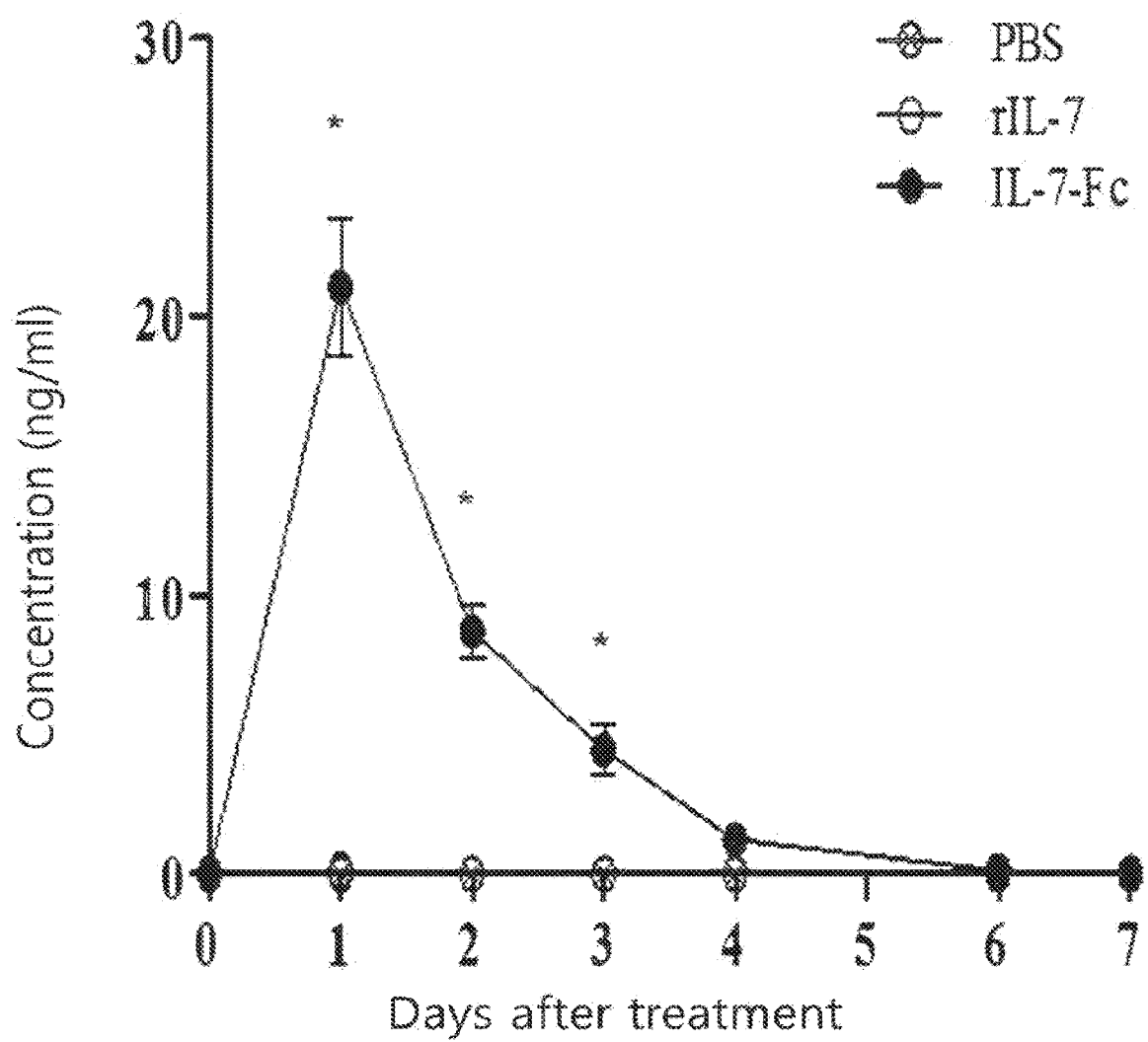
FIG. 3 illustrates that IL-7-Fc is transported to serum through FcRn-mediated transcytosis after administration of PBS, rIL-7, and IL-7-Fc to the mice intravaginally (*, p<0.05 (rIL-7 vs IL-7-Fc)).

Example 2: Confirmation of Systemic Circulation of Intravaginally Administered IL-7-Fc PBS, rIL-7 and IL-7-Fc were intravaginally administered to mice (n=7/group), and serum concentration of IL-7 was measured by human IL-7 ELISA. The results are shown in FIG. 3. As shown in FIG. 3, mice treated with IL-7-Fc, but not rIL-7, showed significantly increased levels of IL-7 as compared to PBS control.

These results reveal that the application of the Fc-fused protein on the mucosal epithelium enables genital-epithelial barrier transcytosis.

Example 3: Analysis of Changes in Leukocyte Number in Cervical Tissues After Local Administration of IL-7-Fc IL-7-Fc was intravaginally administered to mice (n=3/group) at 0, 3, 7, 14 and 21 days prior to sacrifice, and the number of leukocytes in cervical tissues was calculated using flow cytometry (Table 1). In addition, mice (n=6/group) were treated with PBS, IL-7, IL-7-Fc, IFN-α2a-Fc or G-CSF-Fc, and 7 days later, CD4 and CD8 cells in CV tissues were analyzed by flow cytometry. The results are shown in Tables 1 and 2 and FIG. 4. The data in the table below are shown as means±SEMs (*, $p<0.05$).

TABLE 1

| | Absolute cell number after IL-7-Fc treatment | | | | |
|---|---|---|---|---|---|
| | Day 0 | Day 3 | Day 7 | Day 14 | Day 21 |
| Total CD4 T cells (×10$^3$) | 2.86 ± 0.49 | 12.76 ± 0.53* | 51.51 ± 9.18* | 3.33 ± 0.77 | 2.57 ± 0.44 |
| CD62L$^{lo}$ CD44$^{high}$ CD4 T cells (×10$^3$) | 2.21 ± 40.31 | 10.26 ± 0.68* | 35.06 ± 7.03* | 2.51 ± 0.72 | 2.13 ± 0.41 |
| Total CD8 T cells (×10$^3$) | 0.49 ± 0.08 | 1.65 ± 0.18* | 6.21 ± 0.76* | 0.65 ± 0.17 | 0.84 ± 0.30 |
| CD62L$^{lo}$ CD44$^{high}$ CD8 T cells (×10$^3$) | 0.11 ± 0.01 | 0.64 ± 0.11* | 1.96 ± 0.29* | 0.23 ± 0.10 | 0.27 ± 0.14 |
| γδ T cells (×10$^3$) | 0.61 ± 0.14 | 2.40 ± 0.30* | 28.58 ± 3.88* | 2.05 ± 0.56* | 1.80 ± 0.07* |
| Conventional DC (×10$^3$) | 0.33 ± 0.07 | 0.48 ± 0.09 | 2.15 ± 0.31* | 1.02 ± 0.12* | 0.56 ± 0.04 |
| Monocyte derived DC (×10$^3$) | 4.78 ± 0.28 | 10.15 ± 0.83* | 38.89 ± 2.10* | 14.66 ± 2.16* | 5.64 ± 1.03 |

TABLE 2

| | 1 | 2 | 3 | 4 | 5 | Average ± STD |
|---|---|---|---|---|---|---|
| % CD8 T cell in cervix/vagina | | | | | | |
| PBS | 0.01 | 0.00 | 0.03 | 0.00 | 0.00 | 0.01 ± 0.01 |
| IL-7-Fc | 0.02 | 0.03 | 0.02 | 0.02 | 0.03 | 0.03 ± 0.01 |
| IFNα2a-Fc | 0.00 | 0.00 | 0.00 | 0.00 | 0.01 | 0.00 ± 0.00 |
| % CD4 T cell in cervix/vagina | | | | | | |
| PBS | 0.03 | 0.01 | 0.10 | 0.00 | 0.00 | 0.03 ± 0.04 |
| IL-7-Fc | 0.17 | 0.17 | 0.13 | 0.19 | 0.19 | 0.17 ± 0.03 |
| IFNα2a-Fc | 0.01 | 0.00 | 0.00 | 0.01 | 0.01 | 0.01 ± 0.00 |

Figure 4:
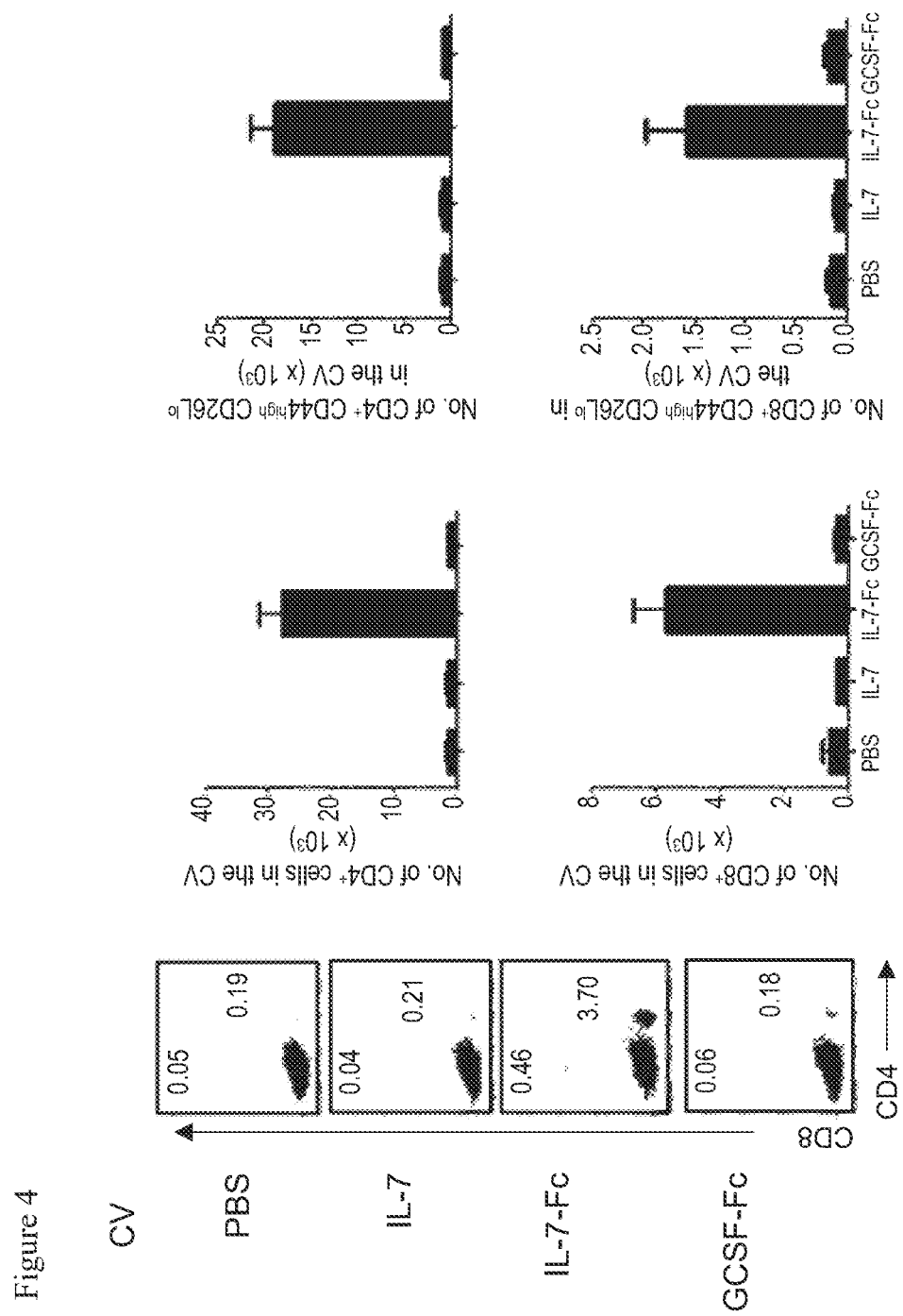
FIG. 4 shows the dot plot of the T cells, the number of CD4 and CD8 T cell counts, and the number of $CD62L^{low}CD44^{high}$ subsets in the CD4 and CD8 T cells (**, p<0.01), in cervical tissues.

As shown in Table 1 and FIG. 4, topical administration of IL-7-Fc increased the number of CD4 and CD8 T cells. This increase of genital tract T cells peaked at 7 days after IL-7-Fc administration and gradually decreased to the baseline levels at day 14. Moreover, the number of CD4 or CD8 T cells was significantly increased by about 20-fold and 10-fold, respectively, at 7 days after IL-7-Fc administration compared with the baseline levels. Particularly, the numbers of $CD44^{high}CD62L^{low}$ effector CD4 and CD8 T cells were significantly increased at day 7 and the number of total CD4 and CD8 T cells was decreased in a similar pattern over time.

As shown in Table 2 and FIG. 4, IFN-α2a-Fc, and G-CSF-Fc administration did not significantly change the number of CD4 and CD8 T cells compared to the baseline level or to the control group.

These results indicate that IL-7-Fc intravaginal administration induces local accumulation of immune cells such as T cells and DCs. Also, it was found that the effect of the IL-7-Fc intravaginal administration was superior to other immune inducers.

Example 4: Evaluation of Toxicity of IL-7-Fc

IL-7-Fc was intravaginally administered to SD rats five times, i.e., at day 1, 8, 15, 22, and 29. Sections of the genital tract were microscopically examined at 33 days post-initial treatment (Table 3A). Vaginal inflammation scores were recorded prior to administration and at 4 and 24 hours after administration using the scoring scale (Table 3B). The results are Shown in Tables 3A and 3B.

TABLE 3A

| | | | Dose (mg/kg) | | | |
|---|---|---|---|---|---|---|
| Tissue | Observation | Severity | 0 | 0.8 | 3 | 8 |
| Total | | | 10 | 10 | 10 | 10 |
| Ovaries | Mineralization[a] | Minimal[c] | 1 | 0 | 2 | 0 |
| | | Within normal limit[e] | 9 | 10 | 8 | 10 |
| Uterus and | Infiltration[b] | Minimal[c] | 3 | 4 | 4 | 3 |
| | | Mild[d] | 0 | 0 | 0 | 2 |
| Cervix | | Within normal limit[e] | 7 | 6 | 6 | 5 |
| Vagina | Infiltration[b] | Minimal[c] | 4 | 3 | 3 | 6 |
| | | Mild[d] | 0 | 0 | 0 | 1 |
| | | Within normal limit[e] | 6 | 7 | 7 | 3 |

[a]Mineralization: the formation or deposition of minerals in a tissue
[b]Infiltration: the presence of mixed leukocyte (i.e. lymphocytes, dendritic cells, macrophage)
[c]Minimal: the amount of change barely exceeds normal limits
[d]Mild: easy identification of the lesion with limited severity and no functional impairment
[e]Within normal limits: the condition to be considered normal

TABLE 3B

| Dose (mg/kg) | Severity | Study interval (Day) | | | | | | | | | | | | | |
|---|---|---|---|---|---|---|---|---|---|---|---|---|---|---|---|
| | | 1[a] | 1[b] | 2[c] | 8[a] | 8[b] | 9[c] | 15[a] | 15[b] | 16[c] | 22[a] | 22[b] | 23[c] | 29[A] | 29[b] | 30[c] |
| 0 (n[d] = 15) | 0[e] | 15 | 15 | 15 | 15 | 15 | 15 | 15 | 15 | 15 | 15 | 15 | 15 | 14 | 14 | 15 |
| | 1[e] | 0 | 0 | 0 | 0 | 0 | 0 | 0 | 0 | 0 | 0 | 0 | 0 | 1 | 1 | 0 |
| | Total | 15 | 15 | 15 | 15 | 15 | 15 | 15 | 15 | 15 | 15 | 15 | 15 | 15 | 15 | 15 |
| 0.8 (n[d] = 10) | 0[e] | 10 | 10 | 10 | 10 | 10 | 10 | 10 | 10 | 10 | 10 | 10 | 10 | 10 | 10 | 10 |
| | Total | 10 | 10 | 10 | 10 | 10 | 10 | 10 | 10 | 10 | 10 | 10 | 10 | 10 | 10 | 10 |
| 3 (n[d] = 10) | 0[e] | 10 | 10 | 10 | 10 | 10 | 10 | 10 | 10 | 10 | 10 | 10 | 10 | 10 | 10 | 10 |
| | Total | 10 | 10 | 10 | 10 | 10 | 10 | 10 | 10 | 10 | 10 | 10 | 10 | 10 | 10 | 10 |
| 8 (n[d] = 15) | 0[e] | 15 | 15 | 15 | 15 | 15 | 15 | 15 | 15 | 14 | 15 | 15 | 15 | 15 | 15 | 15 |
| | 1[e] | 0 | 0 | 0 | 0 | 0 | 0 | 0 | 0 | 1 | 0 | 0 | 0 | 0 | 0 | 0 |
| | Total | 15 | 15 | 15 | 15 | 15 | 15 | 15 | 15 | 15 | 15 | 15 | 15 | 15 | 15 | 15 |

[a]predose
[b]4 hour postdose
[c]24 hour postdose
[d]Number of mice
[e]Vaginal irritation severity scoring scale: 0 = no erythema, 1 = very slight erythema (barely perceptible), 2 = well-defined erythema, 3 = moderate erythema, 4 = sever erythema (redness) to eschar formation As shown in Tables 3A and 3B above, pathological evaluation of the degree of inflammation of cervical tissues (Table 3A) and vagina (Table 3B) showed that the local administration of IL-7-Fc was safe and did not induce serious inflammation within genital tract.

Example 5: Confirmation of the Relationship Between the Administration Route of IL-7-Fc and the Induction of T Cells in the Cervix/Vaginal Tissues IL-7-Fc was administered subcutaneously or intravaginally to mice (n=5/group) and the distribution of T cells in the cervix/vaginal tissues was observed by the method of Preparation Example 6.

Figure 5:
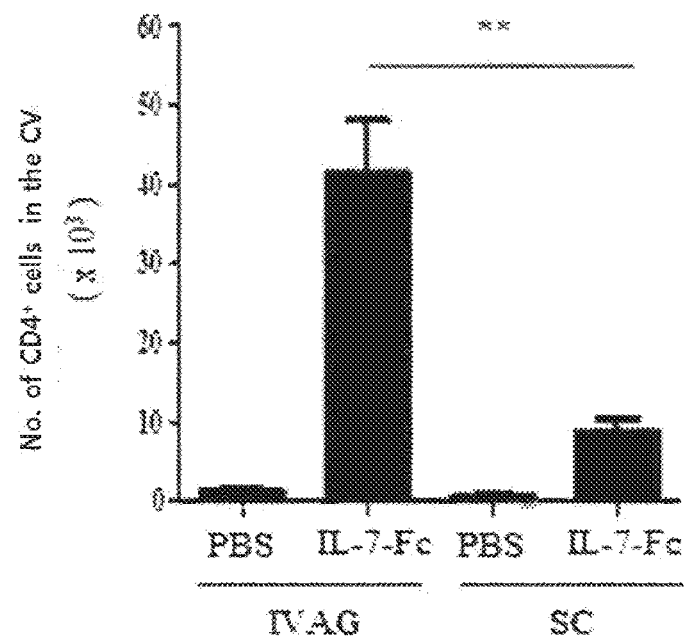
FIG. 5 shows the results of T cell mobilization depending on IL-7-Fc administration route. At 7 days after vaginal administration, T cells in cervical (CV) tissues were analyzed by flow cytometry, and the numbers of CD4 T cells and CD8 T cells were counted (FIG. 5) (**, p<0.01).
Figure 5:
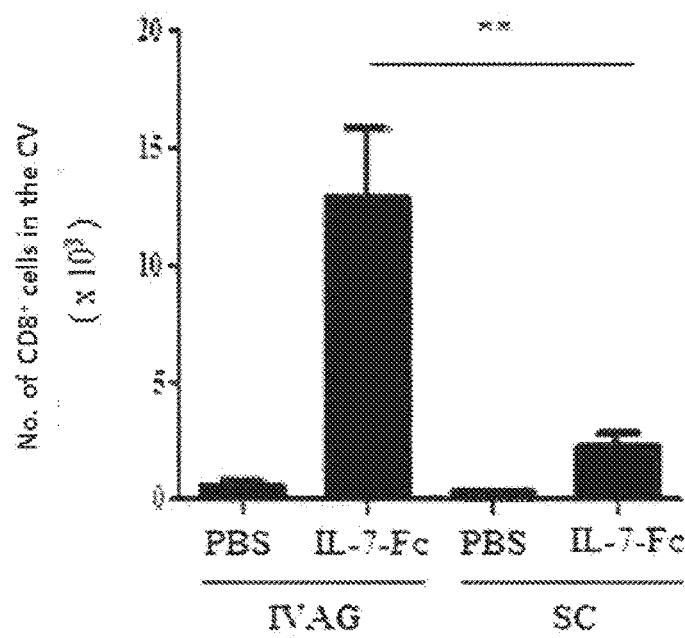

As a result, as shown in FIG. 5, the degree of accumulation of CD4 and CD8 T cells in the cervix/vaginal tissues was more increased by intravaginal administration than subcutaneous administration. Therefore, it was found that in order to induce CD4 and CD8 T cells specifically to the cervix/vaginal tissues, intravaginal administration which is directly related to the cervix/vaginal tissues is more effective than systemic administration such as subcutaneous administration.

Example 6: Anticancer Efficacy by Local Administration of IL-7-Fc Using TC-1/Fluc Model The therapeutic efficacy was confirmed using a TC-1 tumor cell line expressing HPV16 E6 and HPV E7 antigens. 1×10⁶ TC-1/fluc cell line (which was manipulated to express the luciferase gene in the TC-1 cell line expressing the HPV16 E6 and E7 gene) was administered intravaginally to the mice (n=7 or 8/group). Four (4) days before administration of the TC-1/fluc cell line, 3 mg of medroxyprogesterone acetate (Depo-Provera, Pfizer) was administered subcutaneously to the Mice in the diestrus state. On the day of TC-1/fluc cell line administration, the mice were anesthetized and a mixture of 10 µl of 20% nonoxynol-9 (USP) and 40 µl of 3% carboxymethyl cellulose (CMC) (Sigma-Aldrich) was administered intravaginally to the mice, and 6 hours later, the mice were anesthetized again and their vaginas were washed with PBS and then TC-1/fluc cell line was administered to the mice.

Figure 6:
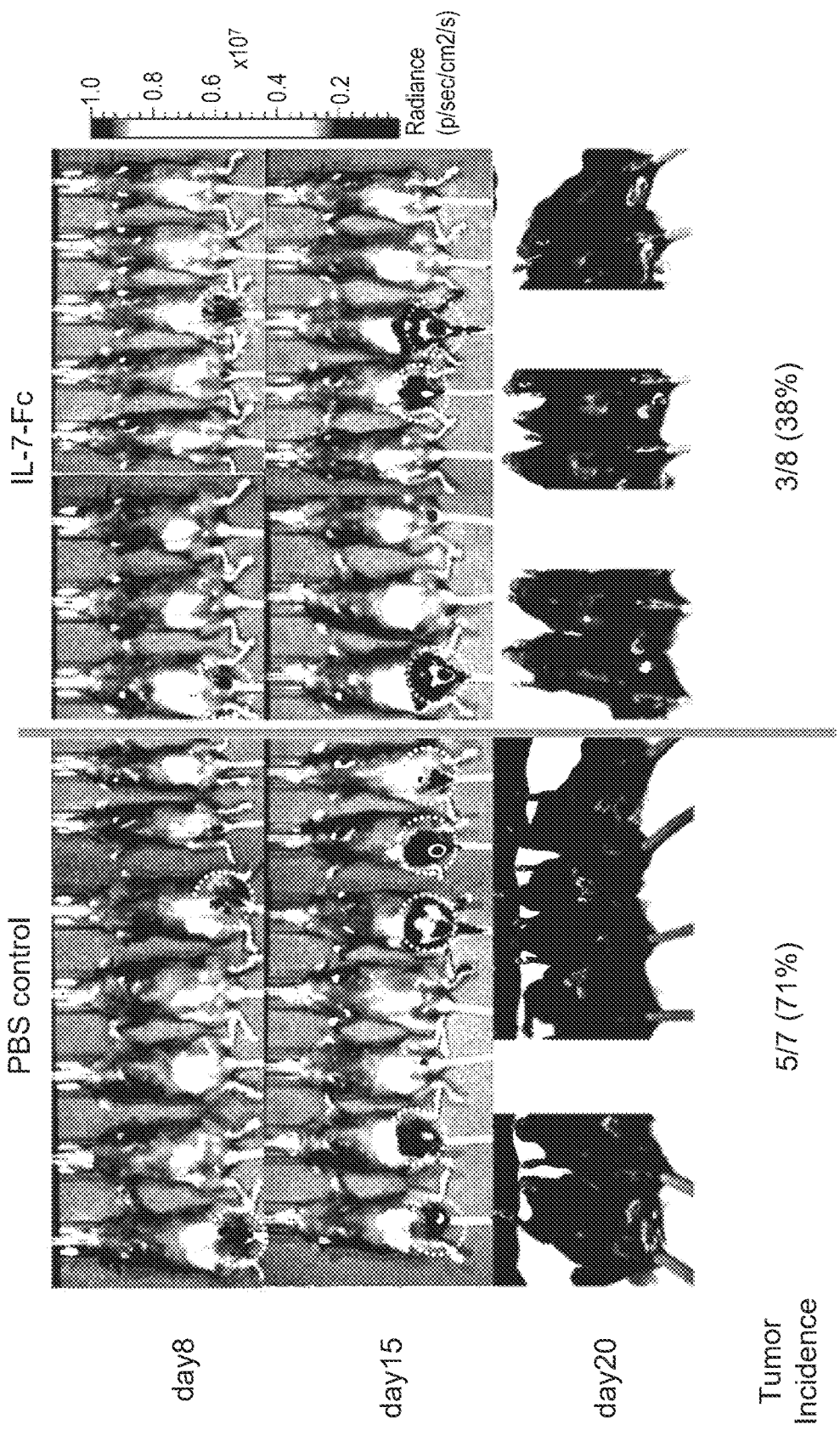
FIG. 6 shows the results of observing the anticancer effect depending on the administration of IL-7-Fc.

At 1, 8, and 15 days after TC-1/fluc cell line administration, 1 µg of IL-7-Fc was intravaginally administered to the mice, and the cancer progression was investigated by in vivo Bioluminescence imaging at days 8 and 15. At day 20, the anticancer effect was examined by observing the appearance (FIG. 6). As a result, it was confirmed that the incidence of cancer cells significantly decreased in the IL-7-Fc-treated group.

```
                        SEQUENCE LISTING

Sequence total quantity: 40
SEQ ID NO: 1            moltype = AA  length = 177
FEATURE                 Location/Qualifiers
REGION                  1..177
                        note = amino acid sequence of human IL-7 (Accession number
                        : P13232)
source                  1..177
                        mol_type = protein
                        organism = synthetic construct
SEQUENCE: 1
MFHVSFRYIF GLPPLILVLL PVASSDCDIE GKDGKQYESV LMVSIDQLLD SMKEIGSNCL   60
NNEFNFFKRH ICDANKEGMF LFRAARKLRQ FLKMNSTGDF DLHLLKVSEG TTILLNCTGQ  120
VKGRKPAALG EAQPTKSLEE NKSLKEQKKL NDLCFLKRLL QEIKTCWNKI LMGTKEH     177

SEQ ID NO: 2            moltype = AA  length = 154
FEATURE                 Location/Qualifiers
REGION                  1..154
                        note = amino acid sequence of rat IL-7 (Accession number :
                        P56478)
source                  1..154
                        mol_type = protein
                        organism = synthetic construct
SEQUENCE: 2
MFHVSFRYIF GIPPLILVLL PVTSSDCHIK DKDGKAFGSV LMISINQLDK MTGTDSDCPN   60
NEPNFFKKHL CDDTKEAAFL NRAARKLRQF LKMNISEEFN DHLLRVSDGT QTLVNCTSKE  120
EKTIKEQKKN DPCFLKRLLR EIKTCWNKIL KGSI                              154

SEQ ID NO: 3            moltype = AA  length = 154
FEATURE                 Location/Qualifiers
REGION                  1..154
                        note = amino acid sequence of mouse IL-7 (Accession number
                        : P10168)
source                  1..154
                        mol_type = protein
                        organism = synthetic construct
SEQUENCE: 3
MFHVSFRYIF GIPPLILVLL PVTSSECHIK DKEGKAYESV LMISIDELDK MTGTDSNCPN   60
NEPNFFRKHV CDDTKEAAFL NRAARKLKQF LKMNISEEFN VHLLTVSQGT QTLVNCTSKE  120
EKNVKEQKKN DACFLKRLLR EIKTCWNKIL KGSI                              154

SEQ ID NO: 4            moltype = AA  length = 177
FEATURE                 Location/Qualifiers
REGION                  1..177
                        note = amino acid sequence of monkey IL-7 (Accession number
                        : NP_001279008)
source                  1..177
                        mol_type = protein
                        organism = synthetic construct
SEQUENCE: 4
MFHVSFRYIF GLPPLILVLL PVASSDCDIE GKDGKQYESV LMVSIDQLLD SMKEIGSNCL   60
NNEFNFFKRH LCDDNKEGMF LFRAARKLKQ FLKMNSTGDF DLHLLKVSEG TTILLNCTGK  120
VKGRKPAALG EPQPTKSLEE NKSLKEQKKL NDSCFLKRLL QKIKTCWNKI LMGTKEH     177

SEQ ID NO: 5            moltype = AA  length = 176
FEATURE                 Location/Qualifiers
REGION                  1..176
                        note = amino acid sequence of cow IL-7 (Accession number :
```

```
                         P26895)
source                   1..176
                         mol_type = protein
                         organism = synthetic construct
SEQUENCE: 5
MFHVSFRYIF GIPPLILVLL PVASSDCDIS GKDGGAYQNV LMVNIDDLDN MINFDSNCLN    60
NEPNFFKKHS CDDNKEASFL NRASRKLRQF LKMNISDDFK LHLSTVSQGT LTLLNCTSKG   120
KGRKPPSLSE AQPTKNLEEN KSSKEQKKQN DLCFLKILLQ KIKTCWNKIL RGIKEH       176

SEQ ID NO: 6             moltype = AA   length = 176
FEATURE                  Location/Qualifiers
REGION                   1..176
                         note = amino acid sequence of sheep IL-7 (Accession number
                            : Q28540)
source                   1..176
                         mol_type = protein
                         organism = synthetic construct
SEQUENCE: 6
MFHVSFRYIF GIPPLILVLL PVASSDCDFS GKDGGAYQNV LMVSIDDLDN MINFDSNCLN    60
NEPNFFKKHS CDDNKEASFL NRAARKLKQF LKMNISDDFK LHLSTVSQGT LTLLNCTSKG   120
KGRKPPSLGE AQPTKNLEEN KSLKEQRKQN DLCFLKILLQ KIKTCWNKIL RGITEH       176

SEQ ID NO: 7             moltype = AA   length = 384
FEATURE                  Location/Qualifiers
REGION                   1..384
                         note = amino acid sequence of human IgD constant region
                            (Genbank accession No. P01880)
source                   1..384
                         mol_type = protein
                         organism = synthetic construct
SEQUENCE: 7
APTKAPDVFP IISGCRHPKD NSPVVLACLI TGYHPTSVTV TWYMGTQSQP QRTFPEIQRR    60
DSYYMTSSQL STPLQQWRQG EYKCVVQHTA SKSKKEIFRW PESPKAQASS VPTAQPQAEG   120
SLAKATTAPA TTRNTGRGGE EKKKEKEKEE QEERETKTPE CPSHTQPLGV YLLTPAVQDL   180
WLRDKATFTC FVVGSDLKDA HLTWEVAGKV PTGGVEEGLL ERHSNGSQSQ HSRLTLPRSL   240
WNAGTSVTCT LNHPSLPPQR LMALREPAAQ APVKLSLNLL ASSDPPEAAS WLLCEVSGFS   300
PPNILLMWLE DQREVNTSGF APARPPPQPG STTFWAWSVL RVPAPPSPQP ATYTCVVSHE   360
DSRTLLNASR SLEVSYVTDH GPMK                                         384

SEQ ID NO: 8             moltype = AA   length = 327
FEATURE                  Location/Qualifiers
REGION                   1..327
                         note = amino acid sequence of Partial human IgG4 constant
                            region (Genbank accession No. AAH25985)
source                   1..327
                         mol_type = protein
                         organism = synthetic construct
SEQUENCE: 8
ASTKGPSVFP LAPCSRSTSE STAALGCLVK DYFPEPVTVS WNSGALTSGV HTFPAVLQSS    60
GLYSLSSVVT VPSSSLGTKT YTCNVDHKPS NTKVDKRVES KYGPPCPSCP APEFLGGPSV   120
FLFPPKPKDT LMISRTPEVT CVVVDVSQED PEVQFNWYVD GVEVHNAKTK PREEQFNSTY   180
RVVSVLTVLH QDWLNGKEYK CKVSNKGLPS SIEKTISKAK GQPREPQVYT LPPSQEEMTK   240
NQVSLTCLVK GFYPSDIAVE WESNGQPENN YKTTPPVLDS DGSFFLYSRL TVDKSRWQEG   300
NVFSCSVMHE ALHNHYTQKS LSLSLGK                                      327

SEQ ID NO: 9             moltype = AA   length = 245
FEATURE                  Location/Qualifiers
REGION                   1..245
                         note = amino acid sequence of hFc01
source                   1..245
                         mol_type = protein
                         organism = synthetic construct
SEQUENCE: 9
RNTGRGGEEK KKEKEKEEQE ERETKTPECP SHTQPLGVFL FPPKPKDTLM ISRTPEVTCV    60
VVDVSQEDPE VQFNWYVDGV EVHNAKTKPR EEQFNSTYRV VSVLTVLHQD WLNGKEYKCK   120
VSNKGLPSSI EKTISKAKGQ PREPQVYTLP PSQEEMTKNQ VSLTCLVKGF YPSDIAVEWE   180
SNGQPENNYK TTPPVLDSDG SFFLYSRLTV DKSRWQEGNV FSCSVMHEAL HNHYTQKSLS   240
LSLGK                                                              245

SEQ ID NO: 10            moltype = AA   length = 245
FEATURE                  Location/Qualifiers
REGION                   1..245
                         note = amino acid sequence of hFc02
source                   1..245
                         mol_type = protein
                         organism = synthetic construct
SEQUENCE: 10
RNTGRGGEEK KGGKEKEEQE ERETKTPECP SHTQPLGVFL FPPKPKDTLM ISRTPEVTCV    60
VVDVSQEDPE VQFNWYVDGV EVHNAKTKPR EEQFNSTYRV VSVLTVLHQD WLNGKEYKCK   120
```

```
VSNKGLPSSI EKTISKAKGQ PREPQVYTLP PSQEEMTKNQ VSLTCLVKGF YPSDIAVEWE    180
SNGQPENNYK TTPPVLDSDG SFFLYSRLTV DKSRWQEGNV FSCSVMHEAL HNHYTQKSLS    240
LSLGK                                                                245

SEQ ID NO: 11            moltype = AA   length = 245
FEATURE                  Location/Qualifiers
REGION                   1..245
                         note = amino acid sequence of hFc03
source                   1..245
                         mol_type = protein
                         organism = synthetic construct
SEQUENCE: 11
RNTGRGGEEK KGSKEKEEQE ERETKTPECP SHTQPLGVFL FPPKPKDTLM ISRTPEVTCV    60
VVDVSQEDPE VQFNWYVDGV EVHNAKTKPR EEQFNSTYRV VSVLTVLHQD WLNGKEYKCK    120
VSNKGLPSSI EKTISKAKGQ PREPQVYTLP PSQEEMTKNQ VSLTCLVKGF YPSDIAVEWE    180
SNGQPENNYK TTPPVLDSDG SFFLYSRLTV DKSRWQEGNV FSCSVMHEAL HNHYTQKSLS    240
LSLGK                                                                245

SEQ ID NO: 12            moltype = AA   length = 245
FEATURE                  Location/Qualifiers
REGION                   1..245
                         note = amino acid sequence of hFc04
source                   1..245
                         mol_type = protein
                         organism = synthetic construct
SEQUENCE: 12
RNTGRGGEEK KSGKEKEEQE ERETKTPECP SHTQPLGVFL FPPKPKDTLM ISRTPEVTCV    60
VVDVSQEDPE VQFNWYVDGV EVHNAKTKPR EEQFNSTYRV VSVLTVLHQD WLNGKEYKCK    120
VSNKGLPSSI EKTISKAKGQ PREPQVYTLP PSQEEMTKNQ VSLTCLVKGF YPSDIAVEWE    180
SNGQPENNYK TTPPVLDSDG SFFLYSRLTV DKSRWQEGNV FSCSVMHEAL HNHYTQKSLS    240
LSLGK                                                                245

SEQ ID NO: 13            moltype = AA   length = 245
FEATURE                  Location/Qualifiers
REGION                   1..245
                         note = amino acid sequence of hFc05
source                   1..245
                         mol_type = protein
                         organism = synthetic construct
SEQUENCE: 13
RNTGRGGEEK KSSKEKEEQE ERETKTPECP SHTQPLGVFL FPPKPKDTLM ISRTPEVTCV    60
VVDVSQEDPE VQFNWYVDGV EVHNAKTKPR EEQFNSTYRV VSVLTVLHQD WLNGKEYKCK    120
VSNKGLPSSI EKTISKAKGQ PREPQVYTLP PSQEEMTKNQ VSLTCLVKGF YPSDIAVEWE    180
SNGQPENNYK TTPPVLDSDG SFFLYSRLTV DKSRWQEGNV FSCSVMHEAL HNHYTQKSLS    240
LSLGK                                                                245

SEQ ID NO: 14            moltype = AA   length = 243
FEATURE                  Location/Qualifiers
REGION                   1..243
                         note = amino acid sequence of mouse IgG Fc variant
source                   1..243
                         mol_type = protein
                         organism = synthetic construct
SEQUENCE: 14
ASAEPRGPTI KPCPPCKCPA PNLEGGPSVF IFPPKIKDVL MISLSPIVTC VVVDVSEDDP    60
DVQISWFVNN VEVHTAQTQT HREDYNSTLR VVSALPIQHQ DWMSGKAFAC AVNNKDLPAP    120
IERTISKPKG SVRAPQVYVL PPPEEEMTKK QVTLTCMVTD FMPEDIYVEW TNNGKTELNY    180
KNTEPVLDSD GSYFMYSKLR VEKKNWVERN SYSCSVVHEG LHNHHTTKSF SRTPGKGGGN    240
SGS                                                                  243

SEQ ID NO: 15            moltype = AA   length = 153
FEATURE                  Location/Qualifiers
REGION                   1..153
                         note = amino acid sequence of modified IL-7(M)
source                   1..153
                         mol_type = protein
                         organism = synthetic construct
SEQUENCE: 15
MDCDIEGKDG KQYESVLMVS IDQLLDSMKE IGSNCLNNEF NFFKRHICDA NKEGMFLFRA    60
ARKLRQFLKM NSTGDFDLHL LKVSEGTTIL LNCTGQVKGR KPAALGEAQP TKSLEENKSL    120
KEQKKLNDLC FLKRLLQEIK TCWNKILMGT KEH                                 153

SEQ ID NO: 16            moltype = AA   length = 154
FEATURE                  Location/Qualifiers
REGION                   1..154
                         note = amino acid sequence of modified IL-7(MM)
source                   1..154
                         mol_type = protein
                         organism = synthetic construct
```

```
SEQUENCE: 16
MMDCDIEGKD GKQYESVLMV SIDQLLDSMK EIGSNCLNNE FNFFKRHICD ANKEGMFLFR    60
AARKLRQFLK MNSTGDFDLH LLKVSEGTTI LLNCTGQVKG RKPAALGEAQ PTKSLEENKS   120
LKEQKKLNDL CFLKRLLQEI KTCWNKILMG TKEH                               154

SEQ ID NO: 17           moltype = AA  length = 155
FEATURE                 Location/Qualifiers
REGION                  1..155
                        note = amino acid sequence of modified IL-7(MMM)
source                  1..155
                        mol_type = protein
                        organism = synthetic construct
SEQUENCE: 17
MMMDCDIEGK DGKQYESVLM VSIDQLLDSM KEIGSNCLNN EFNFFKRHIC DANKEGMFLF    60
RAARKLRQFL KMNSTGDFDL HLLKVSEGTT ILLNCTGQVK GRKPAALGEA QPTKSLEENK   120
SLKEQKKLND LCFLKRLLQE IKTCWNKILM GTKEH                              155

SEQ ID NO: 18           moltype = AA  length = 155
FEATURE                 Location/Qualifiers
REGION                  1..155
                        note = amino acid sequence of modified IL-7(MGM)
source                  1..155
                        mol_type = protein
                        organism = synthetic construct
SEQUENCE: 18
MGMDCDIEGK DGKQYESVLM VSIDQLLDSM KEIGSNCLNN EFNFFKRHIC DANKEGMFLF    60
RAARKLRQFL KMNSTGDFDL HLLKVSEGTT ILLNCTGQVK GRKPAALGEA QPTKSLEENK   120
SLKEQKKLND LCFLKRLLQE IKTCWNKILM GTKEH                              155

SEQ ID NO: 19           moltype = AA  length = 155
FEATURE                 Location/Qualifiers
REGION                  1..155
                        note = amino acid sequence of modified IL-7(DDD)
source                  1..155
                        mol_type = protein
                        organism = synthetic construct
SEQUENCE: 19
DDDDCDIEGK DGKQYESVLM VSIDQLLDSM KEIGSNCLNN EFNFFKRHIC DANKEGMFLF    60
RAARKLRQFL KMNSTGDFDL HLLKVSEGTT ILLNCTGQVK GRKPAALGEA QPTKSLEENK   120
SLKEQKKLND LCFLKRLLQE IKTCWNKILM GTKEH                              155

SEQ ID NO: 20           moltype = AA  length = 156
FEATURE                 Location/Qualifiers
REGION                  1..156
                        note = amino acid sequence of modified IL-7(MMMM)
source                  1..156
                        mol_type = protein
                        organism = synthetic construct
SEQUENCE: 20
MMMMDCDIEG KDGKQYESVL MVSIDQLLDS MKEIGSNCLN NEFNFFKRHI CDANKEGMFL    60
FRAARKLRQF LKMNSTGDFD LHLLKVSEGT TILLNCTGQV KGRKPAALGE AQPTKSLEEN   120
KSLKEQKKLN DLCFLKRLLQ EIKTCWNKIL MGTKEH                             156

SEQ ID NO: 21           moltype = AA  length = 398
FEATURE                 Location/Qualifiers
REGION                  1..398
                        note = amino acid sequence of modified IL-7(M) fused hyFc
source                  1..398
                        mol_type = protein
                        organism = synthetic construct
SEQUENCE: 21
MDCDIEGKDG KQYESVLMVS IDQLLDSMKE IGSNCLNNEF NFFKRHICDA NKEGMFLFRA    60
ARKLRQFLKM NSTGDFDLHL LKVSEGTTIL LNCTGQVKGR KPAALGEAQP TKSLEENKSL   120
KEQKKLNDLC FLKRLLQEIK TCWNKILMGT KEHRNTGRGG EEKKKEKEKE EQEERETKTP   180
ECPSHTQPLG VFLFPPKPKD TLMISRTPEV TCVVVDVSQE DPEVQFNWYV DGVEVHNAKT   240
KPREEQFNST YRVVSVLTVL HQDWLNGKEY KCKVSNKGLP SSIEKTISKA KGQPREPQVY   300
TLPPSQEEMT KNQVSLTCLV KGFYPSDIAV EWESNGQPEN NYKTTPPVLD SDGSFFLYSR   360
LTVDKSRWQE GNVFSCSVMH EALHNHYTQK SLSLSLGK                           398

SEQ ID NO: 22           moltype = AA  length = 399
FEATURE                 Location/Qualifiers
REGION                  1..399
                        note = amino acid sequence of modified IL-7(MM) fused hyFc
source                  1..399
                        mol_type = protein
                        organism = synthetic construct
SEQUENCE: 22
MMDCDIEGKD GKQYESVLMV SIDQLLDSMK EIGSNCLNNE FNFFKRHICD ANKEGMFLFR    60
AARKLRQFLK MNSTGDFDLH LLKVSEGTTI LLNCTGQVKG RKPAALGEAQ PTKSLEENKS   120
```

```
LKEQKKLNDL CFLKRLLQEI KTCWNKILMG TKEHRNTGRG GEEKKKEKEK EEQEERETKT    180
PECPSHTQPL GVFLFPPKPK DTLMISRTPE VTCVVVDVSQ EDPEVQFNWY VDGVEVHNAK    240
TKPREEQFNS TYRVVSVLTV LHQDWLNGKE YKCKVSNKGL PSSIEKTISK AKGQPREPQV    300
YTLPPSQEEM TKNQVSLTCL VKGFYPSDIA VEWESNGQPE NNYKTTPPVL DSDGSFFLYS    360
RLTVDKSRWQ EGNVFSCSVM HEALHNHYTQ KSLSLSLGK                          399

SEQ ID NO: 23           moltype = AA  length = 400
FEATURE                 Location/Qualifiers
REGION                  1..400
                        note = amino acid sequence of modified IL-7(MMM) fused hyFc
source                  1..400
                        mol_type = protein
                        organism = synthetic construct
SEQUENCE: 23
MMMDCDIEGK DGKQYESVLM VSIDQLLDSM KEIGSNCLNN EFNFFKRHIC DANKEGMFLF     60
RAARKLRQFL KMNSTGDFDL HLLKVSEGTT ILLNCTGQVK GRKPAALGEA QPTKSLEENK    120
SLKEQKKLND LCFLKRLLQE IKTCWNKILM GTKEHRNTGR GGEEKKKEKE KEEQEERETK    180
TPECPSHTQP LGVFLFPPKP KDTLMISRTP EVTCVVVDVS QEDPEVQFNW YVDGVEVHNA    240
KTKPREEQFN STYRVVSVLT VLHQDWLNGK EYKCKVSNKG LPSSIEKTIS KAKGQPREPQ    300
VYTLPPSQEE MTKNQVSLTC LVKGFYPSDI AVEWESNGQP ENNYKTTPPV LDSDGSFFLY    360
SRLTVDKSRW QEGNVFSCSV MHEALHNHYT QKSLSLSLGK                         400

SEQ ID NO: 24           moltype = AA  length = 400
FEATURE                 Location/Qualifiers
REGION                  1..400
                        note = amino acid sequence of modified IL-7(MGM) fused hyFc
source                  1..400
                        mol_type = protein
                        organism = synthetic construct
SEQUENCE: 24
MGMDCDIEGK DGKQYESVLM VSIDQLLDSM KEIGSNCLNN EFNFFKRHIC DANKEGMFLF     60
RAARKLRQFL KMNSTGDFDL HLLKVSEGTT ILLNCTGQVK GRKPAALGEA QPTKSLEENK    120
SLKEQKKLND LCFLKRLLQE IKTCWNKILM GTKEHRNTGR GGEEKKKEKE KEEQEERETK    180
TPECPSHTQP LGVFLFPPKP KDTLMISRTP EVTCVVVDVS QEDPEVQFNW YVDGVEVHNA    240
KTKPREEQFN STYRVVSVLT VLHQDWLNGK EYKCKVSNKG LPSSIEKTIS KAKGQPREPQ    300
VYTLPPSQEE MTKNQVSLTC LVKGFYPSDI AVEWESNGQP ENNYKTTPPV LDSDGSFFLY    360
SRLTVDKSRW QEGNVFSCSV MHEALHNHYT QKSLSLSLGK                         400

SEQ ID NO: 25           moltype = AA  length = 401
FEATURE                 Location/Qualifiers
REGION                  1..401
                        note = amino acid sequence of modified IL-7(MMMM) fused hyFc
source                  1..401
                        mol_type = protein
                        organism = synthetic construct
SEQUENCE: 25
MMMMDCDIEG KDGKQYESVL MVSIDQLLDS MKEIGSNCLN NEFNFFKRHI CDANKEGMFL     60
FRAARKLRQF LKMNSTGDFD LHLLKVSEGT TILLNCTGQV KGRKPAALGE AQPTKSLEEN    120
KSLKEQKKLN DLCFLKRLLQ EIKTCWNKIL MGTKEHRNTG RGGEEKKKEK EKEEQEERET    180
KTPECPSHTQ PLGVFLFPPK PKDTLMISRT PEVTCVVVDV SQEDPEVQFN WYVDGVEVHN    240
AKTKPREEQF NSTYRVVSVL TVLHQDWLNG KEYKCKVSNK GLPSSIEKTI SKAKGQPREP    300
QVYTLPPSQE EMTKNQVSLT CLVKGFYPSD IAVEWESNGQ PENNYKTTPP VLDSDGSFFL    360
YSRLTVDKSR WQEGNVFSCS VMHEALHNHY TQKSLSLSLG K                       401

SEQ ID NO: 26           moltype = AA  length = 397
FEATURE                 Location/Qualifiers
REGION                  1..397
                        note = amino acid sequence of human IL-7 fused hyFc
source                  1..397
                        mol_type = protein
                        organism = synthetic construct
SEQUENCE: 26
DCDIEGKDGK QYESVLMVSI DQLLDSMKEI GSNCLNNEFN FFKRHICDAN KEGMFLFRAA     60
RKLRQFLKMN STGDFDLHLL KVSEGTTILL NCTGQVKGRK PAALGEAQPT KSLEENKSLK    120
EQKKLNDLCF LKRLLQEIKT CWNKILMGTK EHRNTGRGGE EKKKEKEEKE QEERETKTPE    180
CPSHTQPLGV FLFPPKPKDT LMISRTPEVT CVVVDVSQED PEVQFNWYVD GVEVHNAKTK    240
PREEQFNSTY RVVSVLTVLH QDWLNGKEYK CKVSNKGLPS SIEKTISKAK GQPREPQVYT    300
LPPSQEEMTK NQVSLTCLVK GFYPSDIAVE WESNGQPENN YKTTPPVLDS DGSFFLYSRL    360
TVDKSRWQEG NVFSCSVMHE ALHNHYTQKS LSLSLGK                           397

SEQ ID NO: 27           moltype = AA  length = 395
FEATURE                 Location/Qualifiers
REGION                  1..395
                        note = amino acid sequence of human IL-7 fused nonlytic
                        mouse Fc
source                  1..395
                        mol_type = protein
                        organism = synthetic construct
SEQUENCE: 27
```

```
DCDIEGKDGK QYESVLMVSI DQLLDSMKEI GSNCLNNEFN FFKRHICDAN KEGMFLFRAA    60
RKLRQFLKMN STGDFDLHLL KVSEGTTILL NCTGQVKGRK PAALGEAQPT KSLEENKSLK   120
EQKKLNDLCF LKRLLQEIKT CWNKILMGTK EHASAEPRGP TIKPCPPCKC PAPNLEGGPS   180
VFIFPPKIKD VLMISLSPIV TCVVVDVSED DPDVQISWFV NNVEVHTAQT QTHREDYNST   240
LRVVSALPIQ HQDWMSGKAF ACAVNNKDLP APIERTISKP KGSVRAPQVY VLPPPEEEMT   300
KKQVTLTCMV TDFMPEDIYV EWTNNGKTEL NYKNTEPVLD SDGSYFMYSK LRVEKKNWVE   360
RNSYSCSVVH EGLHNHHTTK SFSRTPGKGG GNSGS                              395

SEQ ID NO: 28              moltype = DNA   length = 531
FEATURE                    Location/Qualifiers
misc_feature               1..531
                           note = nucleotide sequence of human IL-7
source                     1..531
                           mol_type = other DNA
                           organism = synthetic construct
SEQUENCE: 28
atgttccacg tgagcttcag gtacatcttc ggcctgccac ccctgatcct ggtgctgctg    60
cctgtggcca gctccgactg cgacatcgag ggaaaagacg gcaagcagta cgaaagcgtg   120
ctgatggtgt ccatcgacca gctgctggat tctatgaagg agattgggag taactgcctg   180
aacaatgagt tcaacttctt caaacggcac atttgtgatg ccaacaagga gggaatgttc   240
ctgtttcggg ccgctagaaa actgaggcag ttcctgaaga tgaacagcac cggagacttt   300
gatctgcatc tgctgaaagt gtctgagggc accacaatcc tgctgaactg cactgggcag   360
gtgaaaggaa ggaagcctgc cgctctggga gaggctcagc caaccaagtc actggaggaa   420
aacaaaagcc tgaaggaaca gaagaaactg aatgacctgt gctttctgaa acggctgctg   480
caggagatca aaacatgttg gaacaagatt ctgatgggca caaggaaca c             531

SEQ ID NO: 29              moltype = DNA   length = 534
FEATURE                    Location/Qualifiers
misc_feature               1..534
                           note = nucleotide sequence of modified IL-7(M)
source                     1..534
                           mol_type = other DNA
                           organism = synthetic construct
SEQUENCE: 29
atgttccacg tgagcttcag atacatcttc ggcctgcccc ccctgatcct ggtgctgctg    60
cccgtggcca gcagcatgga ctgcgacatc gagggcaagg acggcaagca gtacgagagc   120
gtgctgatgg tgagcatcga ccagctgctg acagcatga aggagatcgg cagcaactgc   180
ctgaacaacg agttcaactt cttcaagaga cacatctgcg acgccaacaa ggagggcatg   240
ttcctgttca gagccgccag aaagctgaga cagttcctga agatgaacag caccggcgac   300
ttcgacctgc acctgctgaa ggtgagcgag ggcacaacca tcctgctgaa ctgcaccggc   360
caggtcaagg gcagaaagcc cgccgccctg ggcgaggccc agcccaccaa gagcctggag   420
gagaacaaga gcctgaagga gcagaagaag ctgaacgacc tgtgcttcct gaagagactg   480
ctgcaggaga tcaagacctg ctggaacaag atcctgatgg gcaccaagga gcac          534

SEQ ID NO: 30              moltype = DNA   length = 537
FEATURE                    Location/Qualifiers
misc_feature               1..537
                           note = nucleotide sequence of modified IL-7(MM)
source                     1..537
                           mol_type = other DNA
                           organism = synthetic construct
SEQUENCE: 30
atgttccacg tgagcttcag atacatcttc ggcctgcccc ccctgatcct ggtgctgctg    60
cccgtggcca gcagcatgat ggactgcgac atcgagggca aggacggcaa gcagtacgag   120
agcgtgctga tggtgagcat cgaccagctg tggacagca tgaaggagat cggcagcaac   180
tgcctgaaca acgagttcaa cttcttcaag agacacatct gcgacgccaa caaggagggc   240
atgttcctgt tcagagccgc cagaaagctg agacagttcc tgaagatgaa cagcaccggc   300
gacttcgacc tgcacctgct gaaggtgagc gagggcacaa ccatcctgct gaactgcacc   360
ggccaggtga agggcagaaa gcccgccgcc ctgggcgagg cccagcccac caagagcctg   420
gaggagaaca gagcctgaa ggagcagaag aagctgaacg acctgtgctt cctgaagaga   480
ctgctgcagg agatcaagac ctgctggaac aagatcctga tgggcaccaa ggagcac      537

SEQ ID NO: 31              moltype = DNA   length = 540
FEATURE                    Location/Qualifiers
misc_feature               1..540
                           note = nucleotide sequence of modified IL-7(MMM)
source                     1..540
                           mol_type = other DNA
                           organism = synthetic construct
SEQUENCE: 31
atgttccacg tgagcttcag atacatcttc ggcctgcccc ccctgatcct ggtgctgctg    60
cccgtggcca gcagcatgat gatggactgc gacatcgagg gcaaggacgg caagcagtac   120
gagagcgtgc tgatggtgag catcgaccag ctgctggaca gcatgaagga gatcggcagc   180
aactgcctga acaacgagtt caacttcttc aagagacaca tctgcgacgc caacaaggag   240
ggcatgttcc tgttcagagc cgccagaaag ctgagacagt tcctgaagat gaacagcacc   300
ggcgacttcg acctgcacct gctgaaggtg agcgagggca accatcct gctgaactgc    360
accggccagg tgaagggcag aaagcccgcc gccctgggcg aggcccagcc caccaagagc   420
ctggaggaga caagagcct gaaggagcag aagaagctga cgaccgtg cttcctgaag    480
agactgctgc aggagatcaa gacctgctgg aacaagatcc tgatgggcac caaggagcac   540
```

```
SEQ ID NO: 32          moltype = DNA   length = 540
FEATURE                Location/Qualifiers
misc_feature           1..540
                       note = nucleotide sequence of modified IL-7(MGM)
source                 1..540
                       mol_type = other DNA
                       organism = synthetic construct
SEQUENCE: 32
atgttccacg tgagcttcag gtacatcttc ggcctgccac ccctgatcct ggtgctgctg    60
cctgtggcca gctccatggg gatggactgc gacatcgagg gaaaagacgg caagcagtac   120
gaaagcgtgc tgatggtgtc catcgaccag ctgctggatt ctatgaagga gattgggagt   180
aactgcctga acaatgagtt caacttcttc aaacggcaca tttgtgatgc caacaaggag   240
ggaatgttcc tgtttcgggc cgctagaaaa ctgaggcagt tcctgaagat gaacagcacc   300
ggagactttg atctgcatct gctgaaagtg tctgaggcga ccacaatcct gctgaactgc   360
actgggcagg tgaaaggaag gaagcctgcc gctctgggag aggctcagcc aaccaagtca   420
ctggaggaaa acaaaagcct gaaggaacag aagaaactga atgacctgtg ctttctgaaa   480
cggctgctgc aggagatcaa aacatgttgg aacaagattc tgatgggcac caaggagcac   540

SEQ ID NO: 33          moltype = DNA   length = 540
FEATURE                Location/Qualifiers
misc_feature           1..540
                       note = nucleotide sequence of modified IL-7(DDD)
source                 1..540
                       mol_type = other DNA
                       organism = synthetic construct
SEQUENCE: 33
atgttccacg tgagcttcag atacatcttc ggcctgcccc ccctgatcct ggtgctgctg    60
cccgtggcca gcagcgacga tgacgactgc gacatcgagg gcaaggacgg caagcagtac   120
gagagcgtgc tgatggtgag catcgaccag ctgctggaca gcatgaagga gatcggcagc   180
aactgcctga acaacgagtt caacttcttc aagagacaca tctgcgacgc caacaaggag   240
ggcatgttcc tgttcagagc cgccagaaag ctgagacagt tcctgaagat gaacagcacc   300
ggcgacttca acctgcacct gctgaaggtg agcgagggca agccatcctg ctgaactgc   360
accggccagg tgaagggcag aaagcccgcc gccctgggcg aggcccagcc caccaagagc   420
ctggaggaga acaagagcct gaaggagcag aagaagctga acgacctgtg cttcctgaag   480
agactgctgc aggagatcaa gacctgctgg aacaagatcc tgatgggcac caaggagcac   540

SEQ ID NO: 34          moltype = DNA   length = 543
FEATURE                Location/Qualifiers
misc_feature           1..543
                       note = nucleotide sequence of modified IL-7(MMMM)
source                 1..543
                       mol_type = other DNA
                       organism = synthetic construct
SEQUENCE: 34
atgttccacg tgagcttcag atacatcttc ggcctgcccc ccctgatcct ggtgctgctg    60
cccgtggcca gcagcatgat gatgatggac tgcgacatcg agggcaagga cggcaagcag   120
tacgagagcg tgctgatggt gagcatcgac cagctgctgg acagcatgaa ggagatcggc   180
agcaactgcc tgaacaacga gttcaacttc ttcaagagac acatctgcga cgccaacaag   240
gagggcatgt tcctgttcag agccgccaga aagctgagac agttcctgaa gatgaacagc   300
accggcgact tcaacctgca cctgctgaag gtgagcgagg gcacaaccat cctgctgaac   360
tgcaccggcc aggtgaaggg cagaaagccc gccgccctgg gcgaggccca gcccaccaag   420
agcctggagg agaacaagag cctgaaggag cagaagaagc tgaacgacct gtgcttcctg   480
aagagactgc tgcaggagat caagacctgc tggaacaaga tcctgatggg caccaaggag   540
cac                                                                 543

SEQ ID NO: 35          moltype = DNA   length = 1284
FEATURE                Location/Qualifiers
misc_feature           1..1284
                       note = nucleotide sequence of modified IL-7(M) fused hyFc
source                 1..1284
                       mol_type = other DNA
                       organism = synthetic construct
SEQUENCE: 35
atgttccacg tgagcttcag atacatcttc ggcctgcccc ccctgatcct ggtgctgctg    60
cccgtggcca gcagcatgga ctgcgacatc gagggcaagg acggcaagca gtacgagagc   120
gtgctgatgg tgagcatcga ccagctgctg gacagcatga aggagatcgg cagcaactgc   180
ctgaacaacg agttcaactt cttcaagaga cacatctgcg acgccaacaa ggagggcatg   240
ttcctgttca gagccgccag aaagctgaga cagttcctga agatgaacag caccggcgac   300
ttcgacctgc acctgctgaa ggtgagcgag ggcacaacca tcctgctgaa ctgcaccggc   360
caggtgaagg gcagaaagcc cgccgccctg ggcgaggccc agcccaccaa gagcctggag   420
gagaacaaga gcctgaagga gcagaagaag ctgaacgacc tgtgcttcct gaagagactg   480
ctgcaggaga tcaagacctg ctggaacaag atcctgatgg caccaaggag cacaggaac   540
acaggagag gcggcggaga gaaggaagag gaaggagca ggaggaaaga                600
gagaccaaga cccccgagtg ccccagccca acccagcccc tgggcgtgtt cctgttccct   660
cccaagccca aggacaccct gatgatcagc agaacccccg aggtgacctg cgtggtcgtg   720
gatgtgagcc aggaagatcc cgaagtgcag ttcaactggt acgtggatgg cgtggaagtg   780
cacaacgcca agaccaagcc cagagaagag cagttcaact ccacctacag agtggtgagc   840
gtgctgaccg tgctgcacca ggactggctg aacggcaagg agtacaagtg caaggtgtcc   900
```

```
aacaaaggcc tgcccagctc catcgagaag accatcagca aagccaaagg ccagcccaga   960
gaacccagg  tgtacaccct gcctcccagc caggaagaga tgaccaagaa ccaggtgtcc  1020
ctgacctgcc tggtgaaagg cttctacccc agcgacatcg ccgtggagtg ggaaagcaac  1080
ggccagcccg agaacaatta caagacaacc cctcccgtgc tggatagcga tggcagcttc  1140
tttctgtaca gcagactgac cgtggacaag agcagatggc aggaaggcaa cgtgttcagc  1200
tgcagcgtga tgcacgaagc cctgcacaac cactacaccc agaagagcct gtccctgagc  1260
ctgggcaagt gactcgagtc taga                                         1284

SEQ ID NO: 36           moltype = DNA  length = 1272
FEATURE                 Location/Qualifiers
misc_feature            1..1272
                        note = nucleotide sequence of modified IL-7(MM) fused hyFc
source                  1..1272
                        mol_type = other DNA
                        organism = synthetic construct
SEQUENCE: 36
atgttccacg tgagcttcag atacatcttc ggcctgcccc ccctgatcct ggtgctgctg    60
cccgtggcca gcagcatgat ggactgcgac atcgagggca aggacggcaa gcagtacgag   120
agcgtgctga tggtgagcat cgaccagctg ctggacagca tgaaggagat cggcagcaac   180
tgcctgaaca acgagttcaa cttcttcaag agacacatct gcgacgccaa caaggagggc   240
atgttcctgt tcagagccgc cagaaagctg agacagttcc tgaagatgaa cagcaccggc   300
gacttcgacc tgcacctgct gaaggtgagc gagggcacca ccatcctgct gaactgcacc   360
ggccaggtga agggcagaaa gcccgccgcc ctgggcgagg cccagcccac caagagcctg   420
gaggagaaca gagcctgaa ggagcagaag aagctgaacg acctgtgctt cctgaagaga   480
ctgctgcagg agatcaagac ctgctggaac aagatcctga tgggcaccaa ggagcacagg   540
aacacaggca gaggcggcga ggagaagaag aaggaggagg aggagaagga gcaggaggaa   600
agagagacca gacccccga  gtgccccagc cacacccagc ccctgggcgt gttcctgttc   660
cctcccaagc ccaaggacac cctgatgatc agcagaaccc ccgaggtgac ctgcgtggtc   720
gtggatgtga gccaggaaga tcccgaagtg cagttcaact ggtacgtgga tggcgtggaa   780
gtgcacaacg ccaagaccaa gcccagagaa gagcagttca actccaccta cagagtgtg   840
agcgtgctga ccgtgctgca ccaggactgg ctgaacggca aggagtacaa gtgcaaggtg   900
tccaacaaag gcctgcccag ctccatcgag aagaccatca gcaaagccaa aggccagccc   960
agagaacccc aggtgtacac cctgcctccc agcaggaaga tgaccaaga accaggtg    1020
tccctgacct gcctggtgaa aggcttctac cccagcgacg tccgcgtgga gtgggaaagc  1080
aacggccagc ccgagaacaa ttacaagaca accctcccg  tgctggatag cgatggcagc  1140
ttctttctgt acagcagact gaccgtggac aagagcagat ggcaggaagg caacgtgttc  1200
agctgcagcg tgatgcacga agccctgcac aaccactaca cccagaagag cctgtccctg  1260
agcctgggca ag                                                     1272

SEQ ID NO: 37           moltype = DNA  length = 1275
FEATURE                 Location/Qualifiers
misc_feature            1..1275
                        note = nucleotide sequence of modified IL-7(MMM) fused hyFc
source                  1..1275
                        mol_type = other DNA
                        organism = synthetic construct
SEQUENCE: 37
atgttccacg tgagcttcag atacatcttc ggcctgcccc ccctgatcct ggtgctgctg    60
cccgtggcca gcagcatgat gatggactgc gacatcgagg gcaaggacgg caagcagtac   120
gagagcgtgc tgatggtgag catcgaccag ctgctggaca gcatgaagga gatcggcagc   180
aactgcctga acaacgagtt caacttcttc aagagacact ctgcgacgcc aacaaggagg   240
gcatgttcct gttcagagcc gccagaaagc tgagacagtt cctgaagat  aacagcacc   300
ggcgacttcg acctgcacct gctgaaggtg agcgagggca accatcct  gctgaactgc   360
accggccagt gaagggcag aaagcccgcc gccctgggcg aggcccagcc caccaagagc   420
ctggaggaga acagagcct gaaggagcag aagaagctga cgacctgtg cttcctgaag   480
agactgctgc aggagatcaa gacctgctgc aacaagatcc tgatgggcac caaggagcac   540
aggaacacag gcagaggcgg cgaggagaag aagaaggaga aggagaagga ggagcaggag   600
gaaagagaga ccaagacccc cgagtgcccc agccacaccc agcccctggg cgtgttcctg   660
ttccctccca agcccaagga caccctgatg atcagcagaa cccccgaggt gacctgcgtg   720
gtcgtggatg tgagccagga agatcccgaa gtgcagttca actggtacgt ggatggcgtg   780
gaagtgcaca acgccaagac caagcccaga gaagagcagt tcaactccac ctacagagtg   840
gtgagcgtgc tgaccgtgct gcaccaggac tggctgaacg gcaaggagta caagtgcaag   900
gtgtccaaca aaggcctgcc cagctccatc gagaagacca tcagcaaagc caaggccag   960
cccagagaac ccagtgtac accctgcct cccagcagga agatgaccaa gaaccaggt  1020
gtgtccctga cctgcctggt gaaaggcttc taccccagcg acatcgccgt ggagtggaa  1080
agcaacggcc agcccgagaa caattacaag acaaccctc cgtgctgga tagcgatggc  1140
agcttctttt gtacagcag actgaccgtg gacaagagca gatggcagga aggcaacgtg  1200
ttcagctgca gcgtgatgca cgaagccctg cacaaccact acacccagaa gagcctgtcc  1260
ctgagcctgg gcaag                                                  1275

SEQ ID NO: 38           moltype = DNA  length = 1275
FEATURE                 Location/Qualifiers
misc_feature            1..1275
                        note = nucleotide sequence of modified IL-7(MGM) fused hyFc
source                  1..1275
                        mol_type = other DNA
                        organism = synthetic construct
SEQUENCE: 38
atgttccacg tgagcttcag gtacatcttc ggcctgccac ccctgatcct ggtgctgctg    60
```

```
cctgtggcca gctccatggg gatggactgc gacatcgagg gaaaagacgg caagcagtac  120
gaaagcgtgc tgatggtgtc catcgaccag ctgctggatt ctatgaagga gattgggagt  180
aactgcctga acaatgagtt caacttcttc aaacggcaca tttgtgatgc caacaaggag  240
ggaatgttcc tgtttcgggc cgctagaaaa ctgaggcagt tcctgaagat gaacagcacc  300
ggagactttg atctgcatct gctgaaagtg tctgagggca ccacaatcct gctgaactgc  360
actgggcagg tgaaaggaag gaagcctgcc gctctgggag aggctcagcc aaccaagtca  420
ctggaggaaa acaaaagcct gaaggaacag aagaaactga atgacctgtg ctttctgaaa  480
cggctgctgc aggagatcaa aacatgttgg aacaagattc tgatgggcac aaaggaacac  540
cgcaatactg ggcggggcgg ggaggaaaaa aaaaggaga aggaaaagga ggaacaggag  600
gaaagagaga ctaagacccc agaatgtccc agccatactc agccctggg ggtgttcctg  660
tttccccta aacctaagga taccctgatg atcagcagga cacccgaggt gacctgcgtg  720
gtcgtggatg tgagccagga agatcccgaa gtgcagttca ctggtacgt ggatggcgtg  780
gaagtgcaca acgccaagac caagccagaa gaagagcagt tcaactccac ctacagagtg  840
gtgagcgtgc tgaccgtgct gcaccaggac tggctgaacg gcaaggagta caagtgcaag  900
gtgtccaaca aaggcctgcc cagctccatc gagaagacca tcagcaaagc caaaggccaa  960
cccagagaac cccaggtgta caccctgcct cccagccagg aagagatgac caagaaccag 1020
gtgtccctga cctgcctggt gaaaggcttc taccccagcg acatcgccgt ggagtgggaa 1080
agcaacggcc agcccgagaa caattacaag acaaccctc ccgtgctgga tagcgatggc 1140
agcttctttc tgtacagcag actgaccgtg gacaagagca gatggcagga aggcaacgtg 1200
ttcagctgca gcgtgatgca cgaagccctg cacaaccact acacccagaa gagcctgtcc 1260
ctgagcctgg gcaag                                                  1275

SEQ ID NO: 39          moltype = DNA  length = 1278
FEATURE                Location/Qualifiers
misc_feature           1..1278
                       note = nucleotide sequence of modified IL-7(MMMM) fused hyFc
source                 1..1278
                       mol_type = other DNA
                       organism = synthetic construct
SEQUENCE: 39
atgttccacg tgagcttcag atacatcttc ggcctgcccc ccctgatcct ggtgctgctg   60
cccgtggcca gcagcatgat gatgatggac tgcgacatcg agggcaagga cggcaagcag  120
tacgagagcg tgctgatggt gagcatcgac cagctgctgg acagcatgaa ggagatcggc  180
agcaactgcc tgaacaacga gttcaacttc ttcaagagac acatctgcga cgccaacaag  240
gagggcatgt tcctgttcag agccgccaga aagctgagac agttcctgaa gatgaacagc  300
accggcgact cgacctgca cctgctgaag gtgagcgagg gcacaaccat cctgctgaac  360
tgcaccggcc aggtgaaggg cagaaagccc gccgccctgg gcgaggccca gcccaccaag  420
agcctggagg agaacaagag cctgaaggag cagaagaagc tgaacgacct gtgcttcctg  480
aagagactgc tgcaggagat caagacctgc tggaacaaga tcctgatggg caccaaggag  540
cacaggaaca caggcagagg cggcgaggag aagaagaagg agaaggagaa ggaggagcag  600
gaggaaagag agaccaagac ccccgagtgc cccagccaca cccagccct gggcgtgttc  660
ctgttccctc ccaagcccaa ggacaccctg atgatcagca gaaccccga ggtgacctgc  720
gtggtcgtgg atgtgagcca ggaagatccc gaagtgcagt tcaactggta cgtggatggc  780
gtggaagtgc acaacgccaa gaccaagccc agagaagagc agttcaactc cacctacaga  840
gtggtgagcg tgctgaccgt gctgcaccag gactggctga acggcaagga gtacaagtgc  900
aaggtgtcca acaaaggcct gcccagctcc atcgagaaga ccatcagcaa agccaaaggc  960
cagccccagag aacccaggt gtacaccctg cctcccagga aggagatgac caagaac   1020
caggtgtccc tgacctgcct ggtgaaaggc ttctacccca gcgacatcgc cgtggagtgg 1080
gaaagcaacg gccagcccga gaacaattac aagacaaccc ctcccgtgct ggatagcgat 1140
ggcagcttct ttctgtacag cagactgacc gtggacaaga gcagatggca ggaaggcaac 1200
gtgttcagct gcagcgtgat gcacgaagcc ctgcacaacc actacaccca gaagagcctg 1260
tccctgagcc tgggcaag                                               1278

SEQ ID NO: 40          moltype = AA  length = 4
FEATURE                Location/Qualifiers
REGION                 1..4
                       note = oligopeptides conjugated with IL-7
source                 1..4
                       mol_type = protein
                       organism = synthetic construct
SEQUENCE: 40
MMMM                                                                 4
```

The invention claimed is:

1. A pharmaceutical composition comprising an interleukin-7 (IL-7) fusion protein, wherein the IL-7 fusion protein comprises an IL-7 protein, an immunoglobulin Fc region, and an oligopeptide;
   wherein the IL-7 protein comprises: (a) amino acid residues 26-177 of the amino acid sequence set forth in SEQ ID NO: 1; (b) amino acid residues 26-154 of the amino acid sequence set forth in SEQ ID NO: 2; (c) amino acid residues 26-154 of the amino acid sequence set forth in SEQ ID NO: 3; (d) amino acid residues 26-177 of the amino acid sequence set forth in SEQ ID NO: 4; (e) amino acid residues 26-176 of the amino acid sequence set forth in SEQ ID NO: 5; or (f) amino acid residues 26-178 of the amino acid sequence set forth in SEQ ID NO: 6;
   wherein the immunoglobulin Fc region comprises the amino acid sequence set forth in any one of SEQ ID NOs: 9 to 14; and
   wherein the oligopeptide is selected from the group consisting of methionine, glycine, methionine-methionine, glycine-glycine, methionine-glycine, glycine-methionine, methionine-methionine-methionine, methionine-methionine-glycine, methionine-glycine-methionine, glycine-methionine-methionine, methionine-glycine-glycine, glycine-methionine-glycine, glycineglycine-methionine, methionine-methionine-methionine, and glycine-glycine-glycine.

2. The pharmaceutical composition of claim 1, wherein the IL-7 protein is conjugated to the N-terminus or C-terminus of the immunoglobulin Fc region.

3. The pharmaceutical composition of claim 1, wherein the IL-7 protein comprises amino acid residues 26-177 of the amino acid sequence set forth in SEQ ID NO: 1.

4. The pharmaceutical composition of claim 1, wherein the IL-7 fusion protein comprises the amino acid sequence set forth in any one of SEQ ID NOs: 21-27.

5. A modified interleukin-7 (IL-7) fusion protein comprising an IL-7 protein, an immunoglobulin Fc region, and an oligopeptide;
wherein the IL-7 protein comprises: (a) amino acid residues 26-177 of the amino acid sequence set forth in SEQ ID NO: 1; (b) amino acid residues 26-154 of the amino acid sequence set forth in SEQ ID NO: 2; (c) amino acid residues 26-154 of the amino acid sequence set forth in SEQ ID NO: 3; (d) amino acid residues 26-177 of the amino acid sequence set forth in SEQ ID NO: 4; (e) amino acid residues 26-176 of the amino acid sequence set forth in SEQ ID NO: 5; or (f) amino acid residues 26-178 of the amino acid sequence set forth in SEQ ID NO: 6;
wherein the immunoglobulin Fc region comprises the amino acid sequence set forth in any one of SEQ ID NOs: 9 to 14; and
wherein the oligopeptide is selected from the group consisting of methionine, glycine, methionine-methionine, glycine-glycine, methionine-glycine, glycine-methionine, methionine-methionine-methionine, methionine-methionine-glycine, methionine-glycine-methionine, glycine-methionine-methionine, methionine-glycine-glycine, glycine-methionine-glycine, glycine-glycine-methionine, methionine-methionine-methionine, and glycine-glycine-glycine.

6. The modified IL-7 fusion protein of claim 5, wherein the IL-7 protein comprises amino acid residues 26-177 of the amino acid sequence set forth in SEQ ID NO: 1.

7. The modified IL-7 fusion protein of claim 5, which comprises the amino acid sequence set forth in any one of SEQ ID NOs: 21-27.

8. The pharmaceutical composition of claim 2, wherein the IL-7 protein is conjugated to the N-terminus of the immunoglobulin Fc region.

9. The pharmaceutical composition of claim 2, wherein the IL-7 protein consists of amino acid residues 26-177 of the amino acid sequence set forth in SEQ ID NO: 1.

10. The pharmaceutical composition of claim 1, wherein the IL-7 protein is conjugated to the C-terminus of the oligopeptide.

11. The pharmaceutical composition of claim 1, wherein the oligopeptide is methionine-glycine-methionine.

12. The pharmaceutical composition of claim 4, wherein the IL-7 fusion protein comprises the amino acid sequence set forth in SEQ ID NO: 24.

13. The modified IL-7 fusion protein of claim 5, wherein the IL-7 protein is conjugated to the N-terminus or C-terminus of the immunoglobulin Fc region.

14. The modified IL-7 fusion protein of claim 13, wherein the IL-7 protein is conjugated to the N-terminus of the immunoglobulin Fc region.

15. The modified IL-7 fusion protein of claim 5, wherein the IL-7 protein consists of amino acid residues 26-177 of the amino acid sequence set forth in SEQ ID NO: 1.

16. The modified IL-7 fusion protein of claim 5, wherein the IL-7 protein is conjugated to the C-terminus of the oligopeptide.

17. The modified IL-7 fusion protein of claim 5, wherein the oligopeptide is methionine-glycine-methionine.

18. The modified IL-7 fusion protein of claim 5, wherein the IL-7 fusion protein comprises the amino acid sequence set forth in SEQ ID NO: 24.

* * * * *